3,506,720
HALOGENATED HYDROXY-DIPHENYL ETHERS

Ernst Model, Basel, and Jakob Bindler, Riehen, Switzerland, assignors to Geigy Chemical Corporation, Greenburgh, N.Y., a corporation of Delaware
No Drawing. Continuation-in-part of application Ser. No. 345,080, Feb. 17, 1964. This application Aug. 8, 1966, Ser. No. 570,742
Claims priority, application Switzerland, Feb. 22, 1963, 2,250/63
Int. Cl. C07c 43/20, 43/22, 121/60
U.S. Cl. 260—613                                    4 Claims

ABSTRACT OF THE DISCLOSURE

Halogenated-2-hydroxy-diphenyl ethers and esters thereof are useful in bactericidal compositions and methods for the protection of organic materials. Illustrative compounds are 4,2′,4′-trichloro-2-hydroxy-diphenyl ether and 4,2′,4′-trichloro-2-methoxy-diphenyl ether.

---

This is a continuation-in-part of our copending application Ser. No. 345,080, filed Feb. 17, 1964, now abandoned.

The present invention relates to novel halogenated hydroxy-diphenyl ethers and esters thereof, which are useful in the control of microorganisms, and for the protection of organic materials and articles from microorganisms, particularly from bacteria and especially from infestation with bacteria and growth of bacteria thereon, more especially, in a first aspect, for the disinfection of personal and household linen, and for the protection of such materials from growth of microorganisms thereon, and as bacteriostatic agents in bactericidal compositions, for instance, washing agents and liquors.

Such control of microorganisms and, particularly, bacteria, and more especially disinfection of a substrate normally permitting undesirable growth of bacteria thereon and/or protection of said substrate against such growth, consists essentially of applying to said substrate a disinfecting and bacterial growth-inhibiting amount of
(a) a compound of the formula

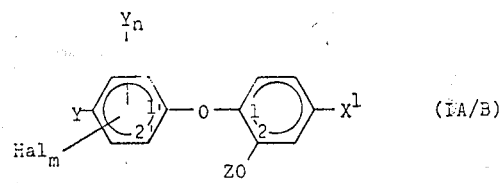

(IA/B)

wherein

Hal represents a halogen atom,
$m$ is an integer ranging from 0 to 3,
$n$ is one of the integers 0 to 2, and the sum of $m+n$ is not more than 3;
$X^1$ is a member selected from the group consisting of chlorine and bromine, and
each Y, independently of the other, represents hydrogen, alkyl of from 1 to 3 carbon atoms, alkoxy of from 1 to 3 carbon atoms, alkanoyl of from 1 to 4 carbon atoms, —$CF_3$, —CN or —$NH_2$; but preferably not more than one Y is an alkoxy, alkanoyl or $NH_2$ group;
Z represents hydrogen, alkyl-carbonyl of from 2 to 18 carbon atoms, alkenyl-carbonyl of from 2 to 18 carbon atoms, benzoyl, chloro-benzoyl, alkyl-benzoyl wherein "alkyl" is from 1 to 3 carbon atoms, N-alkyl-carbamyl and N,N-dialkyl-carbamyl, each of whose "alkyl" groups is of from 1 to 3 carbon atoms, alkoxy-carbonyl of a total of from 2 to 19 carbon atoms, alkyl-sulfonyl of from 1 to 4 carbon atoms, bromo- and chloro-alkyl-sulfonyl wherein each alkyl is of from 1 to 4 carbon atoms, and chloro- and bromo-alkyl-carbonyl wherein "alkyl" is of from 1 to 4 carbon atoms, piperidino-carbonyl, and morpholino-carbonyl;
"alkanoyl" in the definition of Y having preferably 2 to 4 carbon atoms; or (b) a compound of the formula

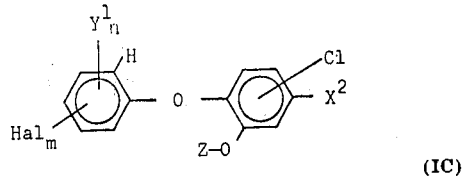

(IC)

and

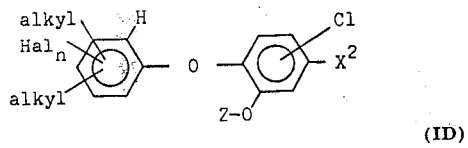

(ID)

wherein

Z, Hal and $m$ and $n$ have the above-given meanings, the sum of $m+n$ in Formula IC not exceeding 4,
$X^2$ is a member selected from the group consisting of hydrogen and chlorine, and
$Y^1$ is a member selected from the group consisting of hydrogen, alkyl of from 1 to 3 carbon atoms, and cyano;
"alkyl" is an alkyl radical of from 1 to 3 carbon atoms; (preferably, Y in Formula IA/B has the same meaning as $Y^1$ in Formula IC).

(When, in this specification and the appended claims, the symbol H is linked to a specific position of a benzene nucleus, as in the above and in some subsequent formulas, this means that that position is only occupied by hydrogen and not by any other substituent of that ring encompassed by the respective formula.)

(c) a compound of the formula

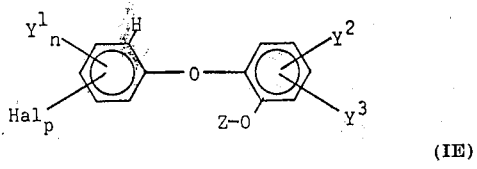

(IE)

wherein

Z, Hal and $n$ have the same meanings as in Formula IA, each of $Y^1$, $Y^2$ and $Y^3$ is a member selected from the group consisting of hydrogen, alkyl of from 1 to 3 carbon atoms, and cyano,
$p$ is an integer ranging from 2 to 3; and the sum of $n+p$ is not more than 3;

(d) a compound of the formula

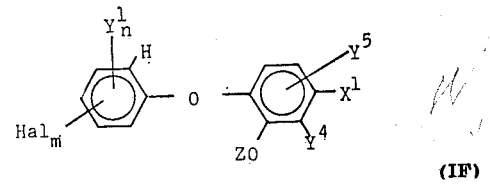

(IF)

wherein

Z, Hal, $m$, $X^1$ and $Y^1$ have the meanings given hereinbefore, the sum of $m+n$ is not greater than 5, and, preferably not greater than 4, $Y^4$ is a member selected from the group consisting of hydrogen, alkyl of from 1 to 3 carbon atoms and allyl, and $Y^5$ is a member selected from the group consisting of hydrogen and alkyl of from 1 to 3 carbon atoms, at least one of $Y^4$ and $Y^5$ being one of the aforesaid members other than hydrogen.

By "halogen" as used in this specification and in the appended claims, there are meant fluorine, bromine, iodine, and, preferably, chlorine.

Among these preferred halogen-o-oxydiphenyl ethers of the foregoing formulas, two sub-groups can be distinguished which have particularly good bactericidal activity in washing agents and which disinfect washed goods and protect them against growth of microorganims thereon, i.e. o-oxyphenyl ethers the benzene ring B of which is unhalogenated, of the formula

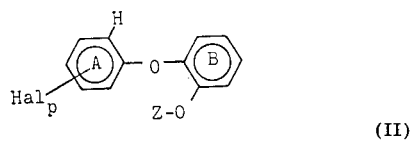

(II)

wherein

Hal and Z have the above-given meanings, $p$ is one of the integers 2 and 3, and the o-oxydiphenyl ethers halogenated in benzene ring B in the p-position to the ether bond, of the formula

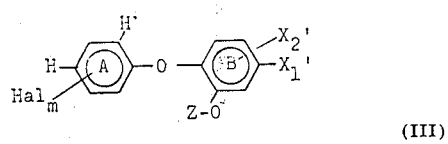

(III)

wherein

Hal and Z have the above-given meanings and $X_1'$ and $X_2'$ both represent chlorine; or $X_1'$ represents bromine and $X_2'$ represents hydrogen, and $m$ represents a positive integer of 0 to 3.

In the compounds of Formulas II and III, the benzene ring A can also contain the methyl, the trifluoromethyl or the methoxy group.

The total number of halogen atoms in the molecule of these compounds is at most 5; when the benzene rings, preferably ring B, further contain lower alkyl groups which may be halogenated, the light-fastness of the compounds of Formula III is generally enhanced. Two alkyl groups in ring B are then preferred.

Two general classes can be distinguished among the compounds of Formulas IA/B, IC, ID, IE, IF, II and III and subsequently described compounds according to the invention, namely, (i) a first class comprising all compounds falling under the foregoing formulas in which Z in all of these compounds represents hydrogen, and (ii) A second class comprising all compounds falling under the foregoing formulas in which Z represents any one of the other meanings enumerated after Formula IA/B.

This second class of compounds is distinguished from the former by being substantially free from causing irritation of the nervous membranes, as compared with the corresponding compounds of the first above class in which Z is hydrogen. The compounds of the second class are, therefore, particularly suited for use in room spraying agents and the like applications, where contact with the numerous membranes of operating personnel may occur.

Compositions according to the invention which contain a compound falling under Formulas IA/B to F as active ingredients, in a bacteria growth-inhibiting amount, are distinguished by slight toxicity for warm blooded animals and, in conventionally used concentrations, do not irritate the skin. They are bactericidally effective both against gram positive as well as gram negative bacteria, for example, against *Bacillus mesientericus, Sarcina spec.* and particularly against forms of coli such as against *Escherichia coli* 96 and other gram negative organisms. A further advantage of the halogen-o-oxydiphenyl ethers used according to the invention is their colorlessness or slight inherent color. This property enables them to be used for many purposes for which it is not possible to use strongly colored known bactericidal compounds.

The above-described compounds used under the first aspect according to the invention are not soluble in water but some are soluble in dilute sodium and potassium hydroxide solutions and/or in all practical organic solvents. Because of this solubility, they can be used in very many ways for the combatting of microorganisms, particularly of bacteria, and for the protection of organic materials and objects from attack by microorganisms.

They can thus be incorporated directly into the material to be protected, for example in material having a synthetic resin basis, as polyamides and polyvinylchloride in paper treatment liquors, in printing thickeners made from starch or cellulose derivatives, in lacquers and paints which contain, e.g., casein, in cellulose, in viscose spinning mass, in paper, in animal mucilages or oils, in permanent dressing having a basis of polyvinyl alcohols, in cosmetic articles such as in soaps, e.g., in hand or toilet soap, in ointments or powders. They can also be added to preparations of inorganic or organic pigments for the painting industry, plasticisers, etc.

Moreover, the above-described compounds of Formulas IA to IF can be used in the form of their organic solutions, e.g. as so-called spray or as dry cleaners or for the impregnation of wood. As organic solvents, preferably those not miscible with water are used, in particular, petroleum fractions, but also water miscible solvents can be used such as low alcohols, e.g. methanol or ethanol or ethylene glycol monomethyl or monoethyl ether.

In addition, they can be used with wetting or dispersing agents in the form of their aqueous dispersions, e.g. for the protection of substances which tend to rot, such as for the protection of leather, paper etc.

Solutions or dispersions of active ingredient which can be used for the protection of these materials advantageously have a content of active ingredient of at least 0.001 g./liter.

A preferred use for the diphenyl ether derivatives consists in disinfecting goods which are washed, and protecting such goods from attack by microorganisms. For this purpose, either washing or rinsing liquors are used which contain the diphenyl ethers advantageously in concentrations of about 1 to 200 parts per million calculated on the liquor.

As wash-active substances, the washing liquors contain, for example, anion active compounds such as aromatic sulfonic acids substituted by lipophilic groups or their water soluble salts such as the sodium salt of dodecyl benzene sulfonic acid, or water soluble salts of sulfuric acid monoesters of higher molecular alcohols or their polyglycol ethers, e.g. soluble salts of dodecyl alcohol sulfate, or of dodecyl alcohol polyglycol ether sulfate, or alkali metal salts of higher fatty acids (soaps), also nonionogenic wash-active substances such as polyglycol ethers of higher fatty alcohols, polyglycol ethers of higher molecular alkylated phenols as well as so-called "amphoteric" wash-active substances such as reaction products of the alkali metal salts of low halogen fatty acids and polyalkylene polyamines containing lipophilic radicals, e.g. lauryl diethylenetriamine. In addition the liquor can also contain the usual auxiliaries such as water soluble perborates, polyphosphates, carbonates, silicates, optical brightening agents, plasticisers, salts having an acid reaction such as ammonium or zinc silicofluoride or certain organic acids such as oxalic acid, also dressings such as, e.g. those having a basis of synthetic resin or starch.

Chiefly, organic fibers are meant by goods which can be disinfected with the washing or rinsing liquors according to the invention, containing the above-described active compounds, namely those of natural origin such as cellulosic fibers, e.g. cotton, or polypeptide fibers, e.g. wool or silk, as well as fibers of synthetic origin such as polyamide polyacrylonitrile or polyester fibers or mixtures of the aforesaid fibers.

In the concentrations mentioned above, the diphenyl ether derivatives usable according to the invention disinfect the wash liquor as well as the goods to be washed therein substantially free from coli and other bacteria, and these substrates remain free from these bacteria for a long time even after exposure to light of the active ingredient or of the goods treated therewith. They differ from other bactericidally active compounds particularly in their stability to light on the goods treated therewith.

In a second aspect the invention concerns the protection of cellulosic materials such as wood and plants from the attack of microorganisms, among them rot-causing fungi and pathogenic fungi, including phytopathogenic fungi.

Such protection comprises the application to the surface of such materials, or incorporation thereinto, of a compound of the formula

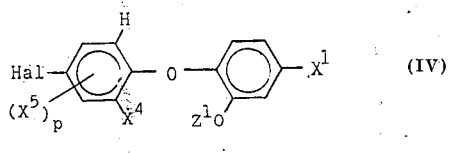

wherein

Hal represents a halogen atom, and preferably chlorine or bromine, $X^1$ is a member selected from among chlorine, bromine and fluorine, preferably chlorine or bromine, $X^4$ is a member selected from the group consisting of hydrogen, chlorine, bromine and cyano, and $X^5$ is a member selected from the group consisting of hydrogen, chlorine, bromine, alkyl of from 1 to 3 carbon atoms, $p$ represents one of the integers 1 and 2, and $Z^1$ has the same meaning as Z, but preferably it is a member selected from the group consisting of hydrogen, alkyl-carbonyl of a total of from 2 to 3 carbon atoms, benzoyl, N-alkyl-carbamyl and N,N-di-alkyl-carbamyl, each of whose alkyl groups is of from 1 to 3 carbon atoms, and alkoxy-carbonyl of a total of from 2 to 5 carbon atoms, in an amount sufficient to inhibit the growth of such microorganisms as rot-causing and pathogenic fungi.

According to a third aspect, this invention concerns more particularly a process for combatting pathogenic bacteria in the intestinal system and the urinal tract of warm-blooded animals, and, generally, in all mammalia, consisting essentially of administering to a warm-blooded animal suffering from an attack of patholgenic bacteria in one of the said organs a bacterial growth-inhibiting amount of a compound falling under Formula IV preferably in combination with an inert carrier therefor of the type described in detail further below.

The compounds of Formula IV and especially those of the aforementioned second class falling under this formula in which Z represents one of the groupings defined hereinbefore other than hydrogen, thus have antimicrobial properties of surprising intensity and variety while, at the same time, their toxicity is relatively slight. Because of these properties as well as their stability, their substantially colorlessness and absence of irritation to the skin, and in the case of the above-mentioned second class of compounds to mucous membranes, they can be used as antimicrobial active substances for the most various purposes, for example, for the protection of organic materials and objects from microorganisms, particularly from attack by bacteria, and also as disinfectant additives in soaps and washing agents as well as in ointments for the skin and other preparations for personal hygiene. Their use, as active ingredients, is particularly valuable for the healing of diseased conditions of the intestinal system and urinal tract of warm blooded animals as can be seen from their excellent activity against the pathogenic fungi and bacteria given below, their elimination from the body in substantially unchanged, active form and their relatively slight toxicity.

In this connection, it is particularly unexpected that the esterified derivaties of Formula IV are of similar and in certain cases even of greater antibacterial activity than the free hydroxyl-diphenyl ethers of Formula IV, even when the esterified compounds of Formula IV are applied in a substantially neutral or even a slightly acid medium, as is the case in the stomach of warm-blooded animals, and normally also in their urinary tract.

The esterified compounds of Formula IV are especially distinguished from those of Formula IV in which $Z^1$ is hydrogen by an unexpected, prolonged activity, in particular against *Escherichia coli*.

The compounds of Formula IV have an excellent growth-inhibiting action, for example, on the following gram positive and gram negative bacteria: *Staphylococcus aureus* Smith, *Staphylococcus lactis*, *Escherichia coli*, *Bacillus pumilus*, *Bacillus subtilis*, *Corynebacterium diphtheriae*, *Clostridium botulinum*, *Clostridium butyricum*, *Clostridium welchii*, *Clostridium tetani*, *Klebsiella pneumoniae*, *Alcaligenes faecalis*, *Salmonella pullorum*, *Salmonella typhi*, *Salmonella paratyphi* A and B, *Salmonelly typhi murium*, *Salmonella enteritidis*, *Shigella dysenteriae*, *Shigella flexneri*, *Brucella abortus*, *Proteus mirabilis*, *Achrombacter spec.*, *Serratia marcescens*, *Pasteurella pseudotuberculosis*.

They also inhibit the growth of the following pathogenic fungi:

*Trichophyton mentagrophytes*, *Trichophyton rubrum*, *Trichophyton tonsurans* var. *sabourandi*, *Trichophyton schönleini*, *Trichophyton quinckeanum*, *Microsporon canis*, *Microsporon gypseum*, *Blastomyces dermatidis*, *Sporotrichum schenckii*, *Epidermophyton floccosum*, *Alternaria tenuis*, *Botrytis cenerea*.

The compounds of Formula IV are also useful as active ingredients for internal use especially for combatting pathogenic fungi in the intestines and urinary tract. Suitable for the latter type of use are tablets for the disinfection of the mouth and throat as well as tablets and sugar coated tablets (dragées) for the disinfection of the intestinal system and urinal tract.

Moreover, these compounds are also useful as active ingredients for disinfectants for the hands, cosmetics, ointments for wounds, eye ointments and other agents for external use.

A preferred sub-group of the halogen-o-oxydiphenyl ethers of Formula IV corresponds to the formula

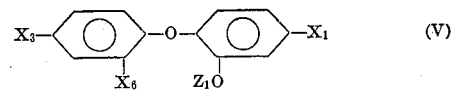

wherein $X^1$ and $Z^1$ have the same meanings as in Formula IV, $X^3$ represents chlorine or bromine, and $X^6$ represents hydrogen or chlorine.

This sub-group is surprisingly superior in its bacteriostatic activity on highly resistant bacteria strains of *Staphylococcus aureus*. It also shows outstanding activity against such well-known phytopathogenic fungi as *Alternaria tenuis* and *Botrytis cinerea*, at concentrations in which the compounds thereof do not display any significant phytotoxicity.

Moreover, this sub-group has an unexpected effect on certain destructive insects, especially on the larvae of certain beetles, among them the black carpet beetle and the woolly bear (attagenus and anthrenus species) which prevents them, in a manner at present not fully understood, from exercizing their destructive activities on such textile materials as carpets, clothes and the like, made wholly or in part from natural polyamide fibers, especially wool.

Therefore, the invention concerns in a fourth aspect, the protection of materials, especially of natural polyamide such as wool, from the attack of destructive insects, especially against the larvae of the aforesaid beetles.

This preferred sub-group is distinguished by this variety of specific activities from other isomeric derivatives falling under the first aspect of this invention, which fail in most or all of them.

The diphenyl ethers usable according to the invention are very active against the bacterial flora causing perspiration odours and, therefore, because of their slight toxicity, are suitable as deodorants for linen and for incorporation into cleansing agents such as soaps or shampoos or as additives for cosmetics such as ointments or creams.

Under the conditions prevailing in the application of the compounds according to this aspect of the invention in washing agents and disinfectants, for external application, which require a distinct alkaline medium and usually heating up to 100° C., the esterified compounds falling under the above formulas hydrolyze under formation of the corresponding free 2-hydroxydiphenyl-ether derivatives which then show the biocidal activity described hereinbefore. Preferred esters are those of Formulas II and III in which Z is one of the acyl radicals of acetic acid, propionic acid, chloroacetic acid, chloropropionic acid, methyl or dimethyl carbamic acid, benzoic acid, chlorobenzoic acid, methylsulfonic acid, and chloromethylsulfonic acid.

The diphenyl ethers usable according to the invention can also be used in combination with other antimicrobially active substances, for example they can be used with halogenated salicyclic acid alkyl amides and anilides, with halogenated diphenyl ureas, with halogenated benzoxazoles or benzoxazolones, with polychlorohydroxydiphenyl methanes, with halogen-dihydroxydiphenyl sulphides, with bactericidal 2 - imino - imidazolidines or - tetrahydropyrimidines or with biocidal quaternary compounds or with certain dithiocarbamic acid derivatives such as tetramethyl thiuram disulphide.

In addition, with some of the combinations mentioned of diphenyl ethers used according to the invention and other antimicrobial substances, there is a broadening of the range of action and/or a synergistic effect. For example, the action of 4,4'-dichloro-2-hydroxydiphenyl ether combined with halogenated hydroxydiphenyl methanes, halogenated salicyclic acid anilides and/or with halogenated diphenyl ureas, on ubiquitous bacilli such as, e.g. *Bacillus mesentericus* and *Sarcina uriae* is clearly improved. The same is also true, e.g. of combinations of 4,2',4'-trichloro-2-hydroxydiphenyl ether and halogenated ureas or halogenated salicylic acid anilides.

Also, for example, a combination of 4,4'-dichloro-2-hydroxydiphenyl ether and 3,4,3',4'-tetrachloro-2,2'-dihydroxydiphenyl methane has a synergistic effect on *Pseudomonas pyocyanea* or a combination of 4,4'-dichloro-2-hydroxydiphenylether and 3,5,6,3',5',6'-hexachloro-2,2'-dihydroxy-diphenyl methane has a synergistic effect e.g. on *Pseudomonas pyocyanea, Serratia marcescens* and *Pseudomonas aeruginosa.*

The compounds of the foregoing formulas possessing a free hydroxyl group are obtained from known starting materials by various known processes.

A first process consists in boiling the diazonium compound of the corresponding 2-amino-halogen diphenyl ether, and thereby replacing the diazo group by a hydroxyl group.

Suitable 2-amino-halogen diphenyl ethers are, e.g.: 2-amino-2',4',5'-trichloro-, 2-amino-4,4'-dichloro-, 2-amino-4'-chloro-4'-bromo-, 2 - amino - 4 - bromo-4'-chloro, 2-amino-4-chloro-4'-fluoro-, 2-amino - 4,3',4' - trichloro-, 2-amino-4,2',4'-trichloro-, 2-amino-4,2',4',5'-tetrachloro-, 2-amino-4,4'-dichloro-3'-methyl- or 2-amino-4,4'-dichloro-3'-trifluoromethyl-diphenyl ether.

The halogen-o-aminodiphenyl ethers used in this process as starting materials can be produced, for example, by condensation of the corresponding 1-nitro-2-fluoro-, 1-nitro-2-chloro- or 1-nitro-2-bromo-benzenes with phenols or phenolates and reduction of the halogen-o-nitrodiphenyl ether formed.

The 2-amino-halogen diphenyl ethers are diazotized and the 2-diazo compounds are then hydrolized by boiling with water or with an aqueous acid, especially sulfuric acid, under conditions known per se.

For example, the diazonium sulfate prepared by means of nitrosyl sulfuric acid or by means of sodium nitrite in sulfuric acid is used as diazonium salt and it is boiled in about 50–80% sulfuric acid at the boiling temperature thereof in the presence of a higher boiling inert organic solvent such as, e.g. o-dichlorobenzene, which takes up the reaction product.

The known 2-amino-halogen-diphenyl ethers usable as starting materials in the above first process, are made from the corresponding halogen-substituted 2-nitrodiphenyl ethers by reduction, e.g. by means of stannous chloride and hydrochloric acid, zinc dust and acetic acid, or iron and hydrochloric acid, or by catalytic hydrogenation. Some of the substituted 2-nitro-diphenyl ethers are known; others can be produced by reaction of correspondingly substituted 2-halogeno-1-nitrobenzenes with alkali metal salts of phenol, 4-halogeno- or 2,4-dihalogenophenols.

A second production process consists in condensing a 1-nitro-2-fluoro-, -chloro- or -bromo-benzene or a 1-nitro-4-fluoro-, -chloro- or -brom-benzene which may contain further halogen atoms with a 1-hydroxy-2-alkoxybenzene which may contain halogen, the condensation being performed in the presence of an acid binding agent, to form the corresponding o-nitro-o'-alkoxy-diphenyl ethers or p-nitro-o'-alkoxydiphenyl ethers and, in any order desired, reducing the nitro group to the amino group, diazotising the latter replacing the diazo group by hydrogen or halogen and then dealkylating the alkozy group, care being taken by the choice of starting materials or the performance of the operations, that the o-hydroxydiphenyl ether formed contains at least one halogen atom in ring A or two halogen in ring B of the final compound.

Examples of suitable 1-nitro-2-fluoro-, -chloro- or -bromo-benzene compounds are 1-nitro-2-fluoro-, -chloro- or -bromo-benzene, 1-nitro-2,3,- or 2,5-dichloro- or 2,3- or -2,5-dibromo-benzene or 1-nitro-2-bromo-5-chlorobenzene; examples of suitable 1-nitro-4-chloro- or -bromo-benzene compounds are 1-nitro-4-chloro- or -bromo-benzene or 1-nitro-3,4-dichloro- or 3,4-dibromo-benzene.

1-hydroxy-2-alkoxybenzene compounds suitable for condensation therewith are, e.g. 1-hydroxy-2-methoxy- or -2-ethoxy-benzene, 1-hydroxy-2-methoxy- or -2-ethoxy-4-chlorobenzene, 1-hydroxy-2-methoxy- or -2-ethoxy-4-bromo-benzene, -1-hydroxy-2-methoxy-4,5-dichloro - benzene or 1-hydroxy-2-methoxy-trichlorobenzene.

In this process the condensation is performed by methods known per se. Sodium or potassium hydroxide solution is used, for example, as acid binding agent. The dealkylation of the alkoxy group, as well as the reduction of the o-nitro- or p-nitro-group to the amino group and, if desired, the diazotation of the latter and replacement of the diazo group by halogen, hydrogen or a cyano group are also performed by known methods.

More in particular the dealkylation can be performed by the methods known for the cleavage of arylalkyl ethers, e.g. by treatment with aluminium chloride in an inert solvent, e.g. in benzene at the boiling temperature thereof, also by heating with concentrated aqueous hydrobromic acid, with hydrogen bromide in glacial acetic acid or a mixture of hydrobromic acid and acetic acid.

More in detail, reaction of alkali metal salts of 2-alkoxy-4-halogen phenols, in particular 4-chloro- or 4-bromo-guaiacol, with 4-halogen-1-nitrobenzenes, 3,4-dihalogen-1-nitrobenzenes, 2,5 - dihalogen-1-nitrobenzenes or 2,3,5-trihalogen - 1 - nitrobenzenes yields 2-alkoxy-4-halogen-4'-nitro-diphenyl ethers, 2 - alkoxy-4,2'-dihalogen-4'-nitrodiphenyl ethers, 2 - alkoxy-4,4'-dihalogen-2'-nitrodiphenyl ethers or 2-alkoxy-2,4,4'-trihalogen-6'-nitrodiphenyl ethers, respectively, which are then converted in a conventional way by catalytic hydrogenation or by reduction with stannous chloride and hydrochloric acid, or by hydrogen in statu nascendi, from zinc dust and acetic acid or from iron and hydrochloric acid, to the corresponding amino compounds.

Amino compounds having an amino group in the 4'-position and, if desired, also those having an amino group in the 2'-position are converted to the corresponding diazonium chlorides and these chlorides are treated according to Sandmeyer with cuprous chloride or cuprous bromide, in order to replace the diazonium chloride group by chlorine or bromine. On the other hand, amino compounds having the amino group in the 2'- or 4'-position, are converted to the corresponding diazonium salts, in particular into the hydrochlorides or sulfates, and these are warmed with ethanol whereby a hydrogen atom takes the place of the intermediary diazonium group.

In a third process, a 1-alkoxy-2-chlorobenzene or 1-alkoxy-2-bromobenzene which may contain further halogen is condensed with the alkali metal salt of a 1-hydroxybenzene which may contain halogen, the condensation being performed in the presence of copper (I) salts, to form the corresponding o-alkoxydiphenyl ether and then the alkoxy group is converted into the hydroxyl group. In the condensation, the components are so chosen that the end product contains at least one halogen atom per molecule.

1-methoxy-2-bromobenzene is mentioned as an example of a 1-alkoxy-2-bromo-benzene, and 1-hydroxy-3,4-dichlorobenzene is mentioned as a 1-hydroxybenzene.

A fourth process consists in halogenating o-hydroxydiphenyl ethers, preferably elementary chlorine, bromine or $SO_2Cl_2$ being used as halogenating agent.

Halogen-o-hydroxypehnyl ethers usable according to the invention are obtained by a fifth process by condensation of 2-chlorobenzoic acids which may contain further halogen, particularly condensation of 2,5-dichlorobenzoic acid, with any halogenated 1-hydroxy-2-alkoxybenzenes followed by decarboxylation and dealkylation of the o-alkoxy group.

Compounds of the Formulas IA/B to IF having free hydroxyl groups are obtained by a further process by producing from a halogenated 2-amino- or 4-amino-2'-hydroxy-diphenyl ether in a known manner, a diazonium salt and converting the latter into the corresponding compound containing hydrogen instead of the original amino group. This modification can be effected with the usual agents, e.g. by boiling in a low alkanol, particularly ethanol, or in dilute hypophosphoric acid.

The halogenated 2-amino- or 4-amino-2'-hydroxy diphenyl ethers used herein are obtained, for example, by first reducing the corresponding 2-alkoxy diphenyl ethers substituted by halogen and a nitro group to the corresponding amino analog and then dealkylating the resulting intermediate analogously, e.g. with aqueous 50%-hydrobramic acid.

Compounds falling under Formulas IA/B to IF which possess an iodine atom in the benzene ring A are produced from 2-amino- or 4-amino-2'-hydroxy-diphenyl ethers by diazotation of the amino group in a conventional manner and replacement of the diazonium group by a known reaction with an aqueous iodine potassium iodide solution.

The acyl derivatives used in the process according to the invention, which fall under the respective Formulas IA/B–IF, are obtained from the correspondingly substituted hydroxy-diphenyl ethers by reaction, in the absence or presence, dependent on the respective acid, of an acid binding agent, with the corresponding acyl halides or anhydrides.

Halogenated 4' - acetyl-2-hydroxy-diphenyl-ethers are obtained for example by a condensation of an alkali metal salt of halogenated 2 - methoxy-1-hydroxybenzene with 4-chloroacetophenone and dealkylation as described above.

In general, the diphenyl ethers usable according to the invention are colorless to weakly yellowish colored solid bodies or liquids which can be purified either by distillation under reduced pressure or by recrystallisation.

The following non-limitative example further illustrate the two aspects of the invention. The temperatures are given in degrees centrigrade. Percentages are by weight unless expressly stated otherwise.

EXAMPLE 1

100 grams (g.) of p-di-chlorobenzene was added within 15 minutes to 500 g. of nitric acid (d 1.5). After a further 15 minutes, the solution was poured into excess of cold water, and the precipitated solid air-dried. The whole was introduced into a solution obtained by adding 88 g. of p-chlorophenol to 37 g. of potassium hydroxide which had previously been heated to a clear melt in presence of 1–2 ml. of water. The mixture was heated in a bath kept at 160–170° for 2 hours, cooled, and shaken with dilute alkali until the precipitated material (162 g.) was crystalline. After one crystallisation from alcohol, the nitro-compound was pure. The nitro-compound was reduced at 100° by means of iron filings and excess of water in presence of a little acetic acid. The crude base, produced in 90% of the theoretical yield, crystallizes from light petroleum (B.P. 80–100°) in colorless needles; M.P. 67° (Groves et al., J. Chem. Soc. (1929) p. 519).

200 g. of 100% nitrosyl sulfuric acid are dissolved in 1560 g. of concentrated sulfuric acid and 381 g. of the above obtained 2-amino-4,4'-dichlorodiphenyl ether are added within about 2 hours while stirring well at 40–45°. The mixture is stirred for another 3 hours at room temperature. 450 ml. of water are then poured in while cooling with ice water whereupon the temperature rises to 70°. 800 ml. of o-dichlorobenzene are added and then the mixture is boiled in an oil bath at 200° (final inner temperature 165°) until no more diazo compound can be traced. The upper organic phase is then removed while still hot, 1000 ml. of water and 125 ml. of 30% sodium hydroxide solution are added and the o-dichlorobenzene is distilled off with steam. The aqueous residue of this steam distillation contains the 2-hydroxy-4,4'-dichlorodiphenyl ether dissolved therein as the sodium salt as well as, as precipitate, 3,6-dichlorodibenzofuran which is formed as side product. After cooling, the aqueous residue is filtered off and washed. The filtrates are poured into 150 ml. of concentrated hydrochloric acid and the precipitate formed, after it has solidified, is filtered off, washed neutral and dried. The crude 2-hydroxy-4,4'-dichlorodiphenyl ether obtained is purified by distillation in vacuo and the distillate is recrystallized from petroleum ether B.P. 201–206°/12–13 torr; M.P. 78–79° (white crystals).

Its formula is

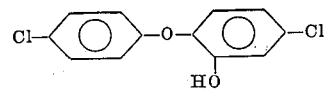

EXAMPLES 2 to 38

By repeating Example 1, but using as reactants equimolar amounts of a 1-chloro-2-nitrobenzene or 1-bromo- 2-nitrobenzene, substituted further as indicated in Column II of Table A below, and of a phenol substituted as indicated in Column III of the said Table A, there are obtained halogenated 2-hydroxy-diphenyl ethers useful as active ingredients in the processes according to the invention, which are substituted in benzene ring B, bearing the 2-hydroxy group of the resulting diphenyl ether, as indicated in Column II, and which are substituted in the other benzene ring A of the diphenyl ether as given in Column III of the aforesaid table:

TABLE A

| Example No. | II<br>Substitution of 1-chloro-2-nitro-benzene (or 1-bromo-2-nitrobenzene where expressly stated) and, correspondingly, of ring B of resulting substance | III<br>Substitution of phenol and, correspondingly, of ring A of resulting substance |
|---|---|---|
| 2 |  | 2',4'-di-chloro. |
| 3 |  | 2',4',5'-trichloro. |
| 4 | 4-chloro | |
| 5 | do | 4'-bromo. |
| 6 | do | 4'-fluoro. |
| 7 | do | 2'-chloro. |
| 8 | do | 3',4'-dichloro. |
| 9 | do | 2',4'-dichloro. |
| 10 | do | 2',4',5'-trichloro. |
| 11 | do | 3'-methyl-4'-chloro. |
| 12 | 4-bromo (from 1,4-dibromo) | 4'-chloro. |
| 13 | do | 4'-bromo. |
| 14 | do | 4'-methoxy. |
| 15 | 4-chloro | 3'-trifluoro-methyl-4'-chloro. |
| 16 | do | 4'-chloro. |
| 17 | 4-chloro-5-methyl | Do. |
| 18 | 4-chloro-3,5-dimethyl | Do. |
| 19 | 4,6-dichloro | 2',4'-dichloro. |
| 20 | do | 3',4'-dichloro. |
| 21 | 6-chloro | 4'-chloro. |
| 22 | do | 3',4'-dichloro. |
| 23 |  | 2',4'-difluoro. |
| 24 |  | 2',4'-dibromo. |
| 25 |  | 2',4'-dichloro. |
| 26 | 4-bromo (from 1,4-dibromo) | 2',5'-dimethyl-4'-chloro. |
| 27 | 4-chloro | 2',4'-dimethyl. |
| 28 | do | 2'-isopropyl-5'-methyl. |
| 29 | do | 4'-ethyl. |
| 30 | do | 3'-methyl-4'-chloro. |
| 31 | 4,6-dichloro | 2',5'-dimethyl-4'-chloro. |
| 32 | 6-chloro | 2',4'-dichloro-5'-methyl (Beilstein 6, II, p. 356). |
| 33 |  | |
| 34 | 4,5-dimethyl | 2',4',5'-trichloro. |
| 35 | 4-methyl | Do. |
| 36 | 4-chloro-5-methyl | 4'-chloro. |
| 37 | 4-chloro-3,5-dimethyl | Do. |
| 38 | 4-chloro-5-methyl | 3'-methyl-4'-chloro. |

EXAMPLE 39

(a) 223 g. of 50.3% potassium hydroxide solution are added dropwise within about 4 hours to the melt of 317 g. of 2-methoxy-4-chlorophenol (4-chloro-guaiacol) and 384 g. of 2,5-dichloro-1-nitrobenzene. The addition is made while stirring well at 115–120°, and water and slight amounts of organic substances are distilled off through a sloping condenser. The temperature is then kept at 145–150° for 12 hours. After cooling, the reaction mixture is poured into a mixture of 3000 ml. of water and 140 ml. of 30% sodium hydroxide solution, the reaction product is taken up on ether, the ether solution is washed neutral and concentrated, finally in vacuo. 2-methoxy-2'-nitro-4,4'-dichlorodiphenyl ether remains as an oil and is further reacted in this state.

(b) 400 g. of iron powder, 1000 ml. of water and 20 ml. of 80% acetic acid are boiled for 15 minutes while stirring well. The crude 2-methoxy-2'-nitro-4,4'-dichlorodiphenyl ether is then added within about 2 hours through a heated dropping funnel and the reduction is completed by refluxing the reaction mixture for 12 hours. The mass is made phenolphthalein alkaline with sodium carbonate, 1000 ml. of chlorobenzene are added and it is again boiled. The hot mixture is filtered through animal charcoal to remove iron slurry, the filtrate is made acid to Congo paper with hydrochloric acid and the chlorobenzene is distilled off with steam. The residue is neutralized with sodium hydroxide solution and, after it has solidified, the 2-methoxy-2'-amino-4,4'-dichlorodiphenyl ether is milled with water, again filtered off, washed neutral and dried. This crude product, which melts at 73–76°, is used without further purification in the next step of the reaction.

(c) 426 g. of finely milled 2-methoxy-2'-amino-4,4'-dichlorodiphenyl ether are added to a mixture of 1500 ml. of hydrobromic acid (48%) and 500 ml. of acetic acid and the whole is boiled for 48 hours. After cooling, the reaction mixture is buffered with sodium hydroxide solution until it just turns Congo paper violet, and then it is made neutral to Congo paper with sodium acetate. The mixture is filtered, the residue is washed neutral and dissolved in 250 ml. of 30% sodium hydroxide solution and 2000 ml. of water, the solution is filtered and the reaction product is precipitated by the addition of hydrochloric acid until the reaction is Congo violet, filtered off, washed neutral and dried. After recrystallisation from ligroin with the addition of animal charcoal, the 2-hydroxy-2'-amino-4,4'-dichlorodiphenyl ether melts at 126–128°.

It is useful as an intermediate in the production of 2'-substituted compounds falling under Formula IV.

(d) 67.5 g. of finely milled 2-hydroxy-2'-amino-4,4'-dichlorodiphenyl ether are added while stirring well to a mixture of 65 ml. of concentrated hydrochloric acid and 175 ml. of water. At 0–5°, 55 g. of a 33% sodium nitrate solution are introduced under the surface of the liquid and the diazo suspension formed is stirred for another 15 hours and then added to 2500 ml. of ethyl alcohol and 7 g. of copper powder. When no more diazo compound can be traced, the mixture is filtered. The alcohol is distilled off from the filtrate, the residue is taken up in ether, the aqueous phase is separated, the ethereal phase is washed neutral and concentrated.

The crude product which remains is distilled under water jet vacuum and the distillate, which passes over at 197–204°/12 torr and solidifies on cooling, is recrystallized from petroleum ether. The 2-hydroxy-4,4'-dichlorodiphenyl ether obtained melts at 78–79°.

EXAMPLE 40

(a) 284 g. of finely ground 2-amino-2'-methoxy-4,4'-dichlorodiphenyl ether are added with vigorous stirring to 300 ml. of concentrated hydrochloric acid and, after the resulting mixture has been cooled to 0 to 5°, 220 g. of aqueous 33%-sodium nitrite solution are introduced below the level of the liquid. The mixture is stirred overnight at 0–5°.

(b) 268 g. of copper sulfate are dissolved in 1 liter of water and heated to 70 to 75°. At this temperature, a solution of 294 g. of potassium cyanide in 500 ml. of water is slowly added to the copper sulfate solution. While maintaining the temperature at 70 to 75°, the diazonium salt suspension prepared as described in (a) above is added with stirring to the copper-sulfate/copper cyanide solution. After cooling, the reaction product is extracted with ether, washed with water to neutral, shaken out with aqueous 5%-sodium hydroxide solution, washed again to neutral with water, dried over anhydrous sodium sulfate, and the ether is then distilled off. The residue is fractioned by distillation in vacuum of 0.2 to 0.3 torr. The fraction boiling at 185–196° consists of pure 2-methoxy-2'-cyano-4,4'-dichlorodiphenyl ether.

(c) 44 g. of the last-mentioned product are mixed with 200 ml. of benzene and 60 g. of aluminum chloride, and the mixture is heated to boiling for 30 minutes. The reaction mass is then poured onto a mixture of ice and concentrated hydrochloric acid and the formed organic layer is separated after decomposition of the formed aluminum complex is complete. The organic layer is then shaken out with a mixture of 250 ml. of water and 15 ml. of aqueous 30%-sodium hydroxide solution, the resulting aqueous layer is separated and then acidified with hydrochloric acid, and the precipitated 4,4'-dichloro-2'-cyano-2-hydroxy-diphenyl ether is separated by filtration, and dried. After recrystallization from ligroin, the pure product is obtained which has a melting point of 145–146°.

Its formula is

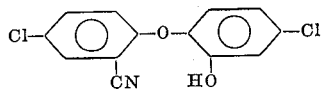

EXAMPLE 41

(a) In a three-necked flask fitted with a stirrer and sloping condenser, 476 g. of 2-methoxy-4-chloro-phenol (4-chloroguaiacol) and 578 g. of 3,4-dichloro-1-nitro-benzene are melted in 400 ml. of diethylene glycol dimethyl ether and, at about 120°, 342 g. of 49.6% potassium hydroxide solution are added dropwise within about 4 hours. The inner temperature is then kept at 140–150° for 12 hours whereupon water and slight amounts of organic substances are distilled off, some even at the beginning of the dropwise addition of the potassium hydroxide solution. The reaction mixture is poured into a mixture of water and sodium hydroxide solution, the precipitate is filtered off, dried and recrystallized from benzene. The 2-methoxy-4,2'-dichloro-4'-nitrodiphenyl ether obtained melts at 159–161°.

(b) 623 g. of 2-methoxy-4,2'-dichloro-4'-nitrodiphenyl ether in 400 ml. of dioxan are catalytically hydrogenated in the presence of 250 g. of Raney nickel at room temperature and normal pressure. After the calculated amount of hydrogen has been taken up, the Raney nickel is filtered off and the 2-methoxy-4,2'-dichloro-4'-aminodiphenyl ether is precipitated with water, filtered off, washed and dried. M.P. 100–120°.

(c) 204 g. of well milled 2-methoxy-4,2'-dichloro-4'-aminodiphenyl ether are added at room temperature while stirring well to a mixture of 254 ml. of concentrated hydrochloric acid and 1600 ml. of water. The suspension obtained is cooled to 0–5° and at this temperature, 225 g. of 33% sodium nitrite solution are added under the surface of the liquid. The mixture is stirred for 12 hours at 0–5°.

A solution of 86 g. of sodium bisulfite and 60 g. of sodium hydroxide in 640 ml. of water are poured at 80° into a solution of 400 g. of crystallized copper sulfate and 106 g. of sodium chloride in 1280 ml. of water. The cuprous chloride formed is allowed to settle, the water on top of it is poured off and the precipitate is purified by decanting three times with water.

The residue is dissolved in 640 ml. of concentrated hydrochloric acid, heated to 65–70° and the diazo suspension obtained according to the first step under (c) in this example is added while stirring. After cooling, the aqueous phase is poured off, the resinous organic phase is taken up in ether, the ether solution is extracted with sodium hydroxide solution, washed neutral, dried over sodium sulfate and concentrated. The residue is distilled under water jet vacuum. 2-methoxy-4,2',4'-trichlorodiphenyl ether is obtained which has a B.P. at 210–217°.

(d) 243 g. of aluminum chloride are added to a solution of 187.5 g. of 2-methoxy-4,2',4'-trichlorodiphenyl ether in 800 ml. of benzene and the reaction mixture is boiled for 30 minutes while stirring. After cooling, it is poured into a mixture of ice and hydrochloric acid, the benzene phase is separated and thoroughly shaken with water and sodium hydroxide solution. The mimosa alkaline aqueous phase is separated, the last traces of benzene are removed by bubbling steam through, then filtered and acidified with hydrochloric acid. The 2-hydroxy-4,2',4'-trichlorodiphenyl ether which precipitates is at first smeary but it solidifies after some time. It is filtered off, washed and dried. After recrystallization from petroleum ether it melts at 60–61°.

2-hydroxy-4,4'-dichlorodiphenyl ether (M.P. 78–79°) (compare Example 1) is obtained in an analogous manner from the methoxy compound obtained at the end of Step (c) of Example 43, infra.

(e) By using in step (a), supra, instead of 4-chloro-2-methoxyphenol, 4-bromo-2-methoxyphenol, and otherwise following the procedure given in steps (a) to (d) 2-hydroxy-4-bromo-2',4'-dichlorodiphenyl ether is obtained as end product. B.P. 223–229°.

EXAMPLE 42

Example 41 is repeated, but instead of 4-chloroguaiacol used as starting material for step (a), there is used 4,5-dichloro-guaiacol, and there is obtained, as end product of step (d), 4,5,2',4'-tetrachloro-2-hydroxy-diphenyl ether.

EXAMPLE 43

Steps (a), (b) and (c) of Example 41 are repeated but in lieu of 2,5-dichloro-1-nitro-benzene there is used an equimolar amount of 1-nitro-4-chloro-benzene, thereby 4-chloro-4'-amino-2-hydroxy-diphenyl ether is obtained as the end product of step (b).

(d) 59 g. of finely ground 4-chloro-4'-amino-2-hydroxy-diphenyl ether are mixed with stirring with 420 g. of aqueous 28.5% sulfuric acid, the mixture is cooled to 0 to 5° and, at this temperature, 55 g. of aqueous 33%-sodium nitrite solution are added. After 3 hours, the diazotation suspension thus obtained is poured into a solution of 68.5 g. of potassium iodide and 68.5 g. of iodine in 70 ml. of water, the mixture is heated to 80° and the dark-colored mass is clarified by addition of an aqueous 15%-sodium bisulfite solution.

After cooling, the resulting solidified mass is separated from the mother liquor by filtration, the residue is dissolved in ether, shaken out with aqueous 15%-bisulfite solution, washed to neutral with water, and the residual ether is distilled off under vacuum. The residue is recrystallized from ligroin to which animal charcoal has been added. A pure 4-chloro-4'-iodo-2-hydroxy-diphenyl ether is obtained which has a melting point of 86 to 88°.

EXAMPLE 44

Repeating Example 43, but starting with an equimolar amount of 1-nitro-3,4-dichloro-benzene in lieu of 4-chloro-nitrobenzene used therein, there is obtained 3,4-dichloro-4'-iodo-2-hydroxy-diphenyl ether.

EXAMPLE 45

Example 39 is repeated by in lieu of 4-chloro-guaiacol an equimolar amount of 4,5-dichloro-guaiacol, and proceding as described in steps (a), (b), (c) and (d) of the said example; 4,5,4'-trichloro-2-hydroxy-diphenyl ether is obtained.

EXAMPLE 46

37.2 g. of 2-hydroxy-diphenyl ether are dissolved in 150 ml. of anhydrous chlorobenzene, and 28 g. of sulfuryl chloride are added drop by drop with stirring, to this solution, the temperature of which is held at 45°. In the course of six hours, the temperature of the resulting mixture is gradually raised to 130° and maintained at that level for one hour. Cholorbenzene is then distilled off and the residue is fractioned by distillation at 12 torr. The fraction boiling at 174–179° consists of pure 2-hydroxy-5-chloro diphenyl ether.

EXAMPLE 47

74 g. of gaseous chlorine are introduced with stirring into a solution of 100 g. of 2-methoxy-diphenyl ether in 500 ml. of glacial acetic acid, while heating the mixture to 50°. The excess of acetic acid is then distilled off and the resulting 5,4'-dichloro-2-methoxy-diphenyl ether is distilled twice under a vacuum of 0.4 torr at a temperature of 144–147°. The reaction obtained after the second distillation consists of pure 5,4'-dichloro-2-methoxy-diphenyl ether which is then converted to 5,4'-dichloro-2-hydroxy-diphenyl ether in the same manner as described under (d) above in Example 41. Recrystallization from petroleum ether yields pure 5,4'-dichloro-2-hydroxy-diphenyl ether, which has a melting point of 78–79°.

EXAMPLE 48

A mixture of 155 g. of 4-chloro-acetophenone and 159 g. of 2-methoxy-4-chlorophenol is charged into a 3-neck flask equipped with stirrer, dropping funnel, thermometer and descending condenser. 113 g. of aqueous 50%-potassium hydroxide solution are added drop by drop to the mixture which was heated to 120°. After water and a small amount of organic material have distilled off, the temperature is raised to 150° and maintained at that level for 24 hours. The reaction mass is then poured onto a mixture of 1 liter of water and 100 ml. of aqueous 30%-sodium hydroxide soltion and the mixture is extracted with ether. The ether phase is washed to neutral with water and then dried over anhydrous sodium sulfate, and the residue subjected to fractionated distillation at 0.07 torr. The fraction distilling at 172–180° is pure 2-methoxy-4-chloro-4'-acetyl-diphenyl ether. The latter compound is converted to 4-chloro-4'-acetyl-2-hydroxy-diphenyl ether in the same manner as described supra under step (d) of Example 41, the pure 2-hydroxy-4-chloro-4'-acetyl-diphenyl ether, obtained by recrystallization from ligroin and has a melting point of 114–115°.

EXAMPLE 49

(a) 22 g. of caustic soda are dissolved in 50 ml. of water, 250 ml. of ethanol are added, and 127.5 g. of 4,4'-dichloro-2-hydroxy-diphenyl ether and 67 g. of allyl bromide are added with stirring to the alcoholic solution. The reaction mixture is then heated to boiling for 18 hours and is then poured into water. The separating 4,4'-dichloro-2-allyloxy-diphenyl ether solidifies after a short time. It is separated from the mother liquor by filtration and recrystallized from methanol. The pure product has a melting point of 67–69°.

(b) 118 g. of the last-mentioned substance are heated to 230°. Thereupon, an exothermic reaction ensues which causes the temperature of the reaction mass to rise to 248°. After this reaction has terminated, the mass is further heated to 245–250° for about 5 minutes, it is then permitted to cool and then extracted with aqueous 5%-sodium hydroxide solution. The aqueous extract is neutralized by adding hydrochloric acid, whereupon 2-hydroxy-3-allyl-4,4'-dichloro-diphenyl ether precipitates. The latter is extracted with ether, the ether phase is washed to neutral with water, dried over anhydrous sodium sulfate, ether is removed by distillation and the residual mass is finally distilled at a pressure of 0.1 torr. The reaction distilling at 158–164° consists of pure 2-hydroxy-3-allyl-4,4'-dichloro-diphenyl ether.

EXAMPLE 50

127 g. of 4,4'-dichloro-2-hydroxy-diphenyl ether are mixed with 60 g. of acetic anhydride, 2 drops of pyridine are added, and the mixture is then refluxed for 10 hours. Excessive acetic anhydride and the acetic acid formed are removed by distillation under vacuum (12 torr) and the residue is fractioned by distillation at 0.08 torr. The fraction boiling at 156–160° consists of pure 4,4'-dichloro-2-acetoxy-diphenyl ether.

In an analogous manner, the 2-acetoxy-diphenyl ethers are produced from the corresponding 2-hydroxy-diphenyl ethers described in Examples 1 to 48, supra, with the exception of the 2-hydroxy-2'-amino derivatives.

EXAMPLE 51

By repeating Example 50, but using an equimolar amount of propionic acid anhydride or of crotonic acid anhydride, the corresponding 2-propionyloxy and crotonyloxy derivatives are obtained.

EXAMPLE 52

58 g. of 4,2',4'-trichloro-2-hydroxy-diphenyl ether are mixed with 31 g. of benzoyl chloride, 2 drops of pyridine and 10 ml. of chlorobenzene are added and heated for 10 hours at 150 to 160°. Chlorobenzene is then distilled off by heating to the boil, and the residue is then fractionated by distillation under vacuum of 0.05 torr. The reaction distilling at 211 to 216° consists of pure 4,2',4'-trichloro-2-benzoyloxy-diphenyl ether.

By repeating Example 52, but using instead of benzoyl chloride equimolar amounts of the acid chloride given in Column 2 of Table B below, and of the 2-hydroxy-diphenyl ether the substituents of which are given in Column 3 of said table, there are obtained the corresponding 2-acyloxy derivatives.

TABLE B

| 1 Example No. | 2 Acid chloride | 3 |
|---|---|---|
| 53 | p-Chloro-benzoyl chloride | 4-chloro-4'-bromo- |
| 54 | N-methyl-carbamyl chloride | 4-chloro-4'-fluoro- |
| 55 | N,N-dimethyl-carbamyl chloride | 4-bromo-4'-chloro- |
| 56 | N-methyl-N-ethyl-carbamyl-chloride | 4,2,'4'-trichloro- |
| 57 | N,N-dipropyl-carbamyl chloride | 4,4'-dichloro-3'-methyl- |
| 58 | Ethyl chloroformiate | 4,4'-dichloro- |
| 59 | Chloroacetyl chloride | 4,4'-dichloro-2'-cyano- |
| 60 | Caproic chloride | 4,4'-dibromo- |
| 61 | Lauric chloride | 4-bromo-4'-chloro- |
| 62 | Stearyl chloride | 4,4'-dichloro- |
| 63 | p-Methyl-benzoyl chloride | 4-chloro-4'-bromo |
| 64 | Decyl chloroformiate | 4-chloro-4'-iodo- |

EXAMPLE 65

28 g. of the sodium salt of 4,4'-dichloro-2-hydroxy-diphenyl ether (obtained by reacting of the diphenyl ether with sodium methylate in a conventional manner) are dissolved in 100 ml. of anhydrous benzene, and a solution of 13 g. methylsulfonyl chloride in 25 ml. of anhydrous benzene is added drop by drop thereto, the resulting mixture is stirred for 5 hours at 20 to 25°, precipitated sodium chloride is separated by filtration, benzene is distilled off and the residue is re-crystallized from ligroin. 20.5 g. of 4,4'-dichloro-2-methylsulfonyloxy-diphenyl ether are obtained; the substance melts at 113.5 to 115°.

By repeating Example 65, but using, instead of the starting sodium salt, an equimolar amount of the sodium salts of the 2-hydroxy-diphenyl ethers, the substituents of which are given in Column 2 of Table III, and instead of methylsulfonyl chloride an equimolar amount of the acyl chlorides given in Column 3 of Table C below, there are obtained the corresponding 2-acyloxy-diphenyl ethers.

TABLE C

| Example No. | 2-hydroxy-diphenyl substituted by: | Acyl chloride |
|---|---|---|
| 66 | 4-chloro-4'-iodo- | Chloromethyl-sulfonyl chloride. |
| 67 | 4,2'-dichloro- | Acrylyl chloride. |
| 68 | 4,2',4'-trichloro- | Acetyl chloride. |
| 69 | 2,4'-dichloro- | Undecenoyl chloride. |
| 70 | 4-chloro- | Oleyl chloride. |
| 71 | 4,4'-dichloro- | Butyl-sulfonyl chloride. |

EXAMPLE 72

A solution of 15.3 g. of fumaryl chloride in 50 ml. of anhydrous benzene is added drop by drop to a solution of 63 g. of the sodium salt of 4,4′-dichloro-2-hydroxy-diphenyl ether in 200 ml. of anhydrous benzene, while stirring well and maintaining the temperature of the solution at 10–15°. After standing for 3 hours at that temperature, sodium chloride crystals formed in the solution are separated by filtration and benzene is removed from the filtrate by distillation under vacuum. The residue is recrystallized from benzene/petroleum ether. The pure 2,2-fumaryloxy-bis-(4,4′-dichloro-diphenyl ether) thus obtained has a melting point of 147–148°.

By using, in lieu of fumaryl chloride, the acyl chloride listed in Column I of Table D below and using, instead of the diphenyl ether derivative used therein, the 2-hydroxy-diphenyl ethers substituted as shown in Column II of the table below, and otherwise observing the conditions described in Example 72, bis-(2-hydroxy-diphenyl ether)-acyl-dioxy derivatives, the acyl radical of which is that shown in Column I and the substitution of the diphenyl-ether moieties of which is that shown in Column II of Table D are obtained:

TABLE D

| Example No. | I | II |
|---|---|---|
| 73 | Oxalyl chloride | 4,4′-dibromo- |
| 74 | Malonyl chloride | 4,4′-dichloro-3′-methyl- |
| 75 | Succinyl chloride | 4,2′,4′-trichloro |
| 76 | Glutaryl chloride | 4-bromo-4′-chloro- |
| 77 | Adipyl chloride | 4-chloro-4′-bromo- |
| 78 | Pimelyl chloride | 4-4′-dibromo- |
| 79 | Sebacyl chloride | 4-chloro-4′-fluoro- |
| 80 | Dodecane-di-oyl chloride | 4,4′-dichloro- |

The above-exemplified bis-(2-halogeno - hydroxy-diphenyl ether) acyl dioxy derivatives, the nuclei of which are of the formula

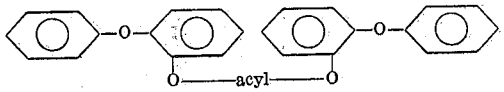

wherein "acyl" is the radical of an aliphatic saturated α,ω-dicarboxylic acid of from 2 to 12 carbon atoms or of an aliphatic unsaturated α,ω-dicarboxylic acid of from 4 to 12 carbon atoms, and which nuclei are substituted in the manner described in the individual diphenyl ether moieties under formulas IA/B to IF supra, show similar antibacterial activities as the compounds defined by the last-mentioned formulas.

Those whose substitution corresponds to that of Formula IV show an even longer duration of anti-bacterial activity than the corresponding derivatives of Formula IV usually accompanied by a shift of activity from the urinary tract to the intestines of warm-blooded animals.

The following non-limitative examples further illustrate the processes of controlling pathogenic bacteria, according to the invention:

EXAMPLE I

(A) Use in washing liquor

One of the active ingredients given below which, to attain better dispersion has been dissolved in ethylene glycol monomethyl ether (in the ratio of 1 part of active ingredient to 20 parts of solvent) is added in a concentration of 25 mg./liter to a washing liquor containing 1.5 g. per liter of sodium soap. Cotton cambric is entered into this liquor (liquor ratio 1:20) and the bath is heated to 90°. The textile material is treated for 20 minutes at this temperature, then rinsed twice for 3 minutes at 40° with permutite water (liquor ratio 1:20), centrifuged and dried and ironed.

(B) Test of the action on bacteria

Circular samples having 20 mm. diameter of the textile material washed and finished according to paragraph (A) are placed on agar dishes which have been innoculated either with 24 hour old cultures of *Staphylococcus aureus* SG 511 or with *Escherichia coli* 96. The agar plates are incubated for 24 hours at 37°.

(C) Result

Neither *Staphylococcus aureus* SG 511 nor *Escherichia coli* 96 are found to be present in the circular samples treated with the following halogen-o-hydroxydiphenyl ethers. An area free from bacteria is formed around the samples on the agar.

(D) Active substances

The following halogen-o-hydroxydiphenyl ethers are tested in the example:

3′,4′-dichloro-2-hydroxydiphenyl ether,
2′,4′-dichloro-2-hydroxydiphenyl ether,
2′,4′,5′-trichloro-2-hydroxydiphenyl ether,
4-chloro-2-hydroxydiphenyl ether,
4,4′-dichloro-2-hydroxydiphenyl ether,
4-chloro-4′-bromo-2-hydroxydiphenyl ether,
4-chloro-4′-iodo-2-hydroxydiphenyl ether,
4-chloro-4′-fluoro-2-hydroxydiphenyl ether,
4,2′-dichloro-2-hydroxydiphenyl ether,
4,3′,4′-trichloro-2-hydroxydiphenyl ether,
4,2′,4′-trichloro-2-hydroxydiphenyl ether,
4,2′,4′,5′-tetrachloro-2-hydroxydiphenyl ether,
4,4′-dichloro-3′-methyl-2-hydroxydiphenyl ether,
4-bromo-4′-chloro-2-hydroxydiphenyl ether,
4-bromo-2-hydroxyphenyl ether,
4,5,4′-trichloro-2-hydroxydiphenyl ether,
4,5,2′,4′-tetrachloro-2-hydroxydiphenyl ether,
4-bromo-2′,4′-dichloro-2-hydroxydiphenyl ether,
4,4′-dibromo-2-hydroxydiphenyl ether; and
4-chloro-4′-methoxy-2-hydroxydiphenyl ether.

By using, in the example, instead of 25 mg./liter active substance, 100 mg./liter, and otherwise following the procedure given, similar results are obtained with the other following halogen-o-diphenyl ethers:

4,4′-dichloro-3′-trifluoromethyl-2-hydroxydiphenyl ether, and
5,4′-chloro-2-hydroxydiphenyl ether.

EXAMPLE II

A solution of each of the following active substances in ethylene glycol monomethyl ether containing 25 mg./liter (1 part of active substance in 20 parts of solvent) is added to equal parts of a washing liquor prepared for it containing 0.3 g. per liter of octylphenol polyglycol ether and 1.7 g. per liter of "wash alkali" (sodium polyphosphate). Cuttings of cotton cambric (liquor ratio 1:20) are washed for 20 minutes at 90° in the liquors so prepared, then rinsed with permutite water in a liquor ratio of 1:20, centrifuged, dried and ironed.

The washed and finished textile cuttings are tested by the methods given in Example I, paragraph (B). The circular cuttings washed in the presence of the following halogen-o-hydroxydiphenyl ethers show no growth of *Staphylococcus aureus* SG 511 or *Escherichia coli* 96 and there is a clear area round the samples on the previously inoculated agar in which there is no bacterial growth.

In this example, the following halogen-o-hydroxydiphenyl ethers were tested as protective agents:

2′,4′,5′-trichloro-2-hydroxydiphenyl ether,
4,4′-dichloro-2-hydroxydiphenyl ether,
4-chloro-4′-bromo-2-hydroxydiphenyl ether,
4-chloro-4′-iodo-2-hydroxydiphenyl ether,
4-chloro-4′-fluoro-2-hydroxydiphenyl ether,
4,3′,4′-trichloro-2-hydroxydiphenyl ether,
4,2′,4′-trichloro-2-hydroxydiphenyl ether,
4,2′,4′,5′-tetrachloro-2-hydroxydiphenyl ether,
4,4′-dichloro-3′-methyl-2-hydroxydiphenyl ether,
4-bromo-4′-chloro-2-hydroxydiphenyl ether, 4-bromo-2-hydroxydiphenyl ether,
4-bromo-2',4'-dichloro-2-hydroxydiphenyl ether,
4,4'-dibromo-2-hydroxydiphenyl ether,
4-chloro-4'-methoxy-2-hydroxydiphenyl ether, and
2-hydroxy-2'-amino-4,4'-dichloro-diphenyl ether.

EXAMPLE III

One of the active substances given below which for better dispersion has been dissolved in ethylene glycol monomethyl ether (1 part of active substance in 20 parts of solvent) is added to equal parts of a washing liquor containing 1.5 g. per liter of sodium soap in a concentration of 100 mg./liter. Pieces of wool muslin are washed in this preparation at 40°, liquor ratio 1:20. The textiles are left for 20 minutes at this temperature and then rinsed twice for 3 minutes at 40° with permutite water, liquor ratio 1:20, centrifuged and dried.

The resistance of the goods treated to bacteria is tested as described in Example I, paragraph (B). The goods treated with the following active substances acording to paragraph (A) remained free from *Staphylococcus aureus* SG 511 and *Escherichia coli* 96 and an area free from bacteria was formed on the agar round the samples.

The following halogen-o-hydroxydiphenyl ethers were tested:

3',4'-dichloro-2-hydroxydiphenyl ether,
2',4'-difluoro-2-hydroxydiphenyl ether,
2',4'-dichloro-2-hydroxydiphenyl ether,
2',4'-dibromo-2-hydroxydiphenyl ether,
2',4',5'-trichloro-2-hydroxydiphenyl ether,
4-chloro-2-hydroxydiphenyl ether,
4,4'-dichloro-2-hydroxydiphenyl ether,
4-chloro-4'-bromo-2-hydroxydiphenyl ether,
4-chloro-4'-iodo-2-hydroxydiphenyl ether,
4-chloro-4'-fluoro-2-hydroxydiphenyl ether,
4,2'-dichloro-2-hydroxydiphenyl ether,
4,3',4'trichloro-2-hydroxydiphenyl ether,
4,2',4'-trichloro-2-hydroxydiphenyl ether,
4,2',4',5'-tetrachloro-2-hydroxyphenyl ether,
4,4'-dichloro-3'-methyl-2-hydroxydiphenyl ether,
4-bromo-4'-chloro-2-hydroxydiphenyl ether,
4-bromo-2-hydroxydiphenyl ether,
4,5,4'-trichloro-2-hydroxydiphenyl ether,
4,5,2',4'-tetrachloro-2-hydroxydiphenyl ether,
4-bromo-2',4'-dichloro-2-hydroxydiphenyl ether,
4,4'-dibromo-2-hydroxydiphenyl ether,
4-chloro-4'-methoxy-2-hydroxydiphenyl ether,
5,4'-di-chloro-2-hydroxydiphenyl ether,
5-chloro-2-hydroxydiphenyl ether, and
4,4'-dichloro-2'-cyano-2-hydroxydiphenyl ether.

EXAMPLE IV

Instead of 25 mg./liter active substance, 100 mg./liter of each active substance are added to equal parts of the washing liquor described in Example II. A cutting of wool muslin is washed in each of these preparations and the washing is finished as described in Example III.

The resistance of the treated goods to the growth of bacteria is tested as described in Example I, paragraph (B). It showed complete absence of *Staphylococcus aureus* SG 511 and *Escherichia coli* 96 on the treated goods. The samples are clearly surrounded by a bacteria-free zone on the agar.

The following halogen-o-hydroxydiphenyl ethers are tested:

2',4'-dichloro-2-hydroxydiphenyl ether,
2',4',5'-trichloro-2-hydroxydiphenyl ether,
4-chloro-2-hydroxydiphenyl ether,
4,4'-dichloro-2-hydroxydiphenyl ether,
4-chloro-4'-bromo-2-hydroxydiphenyl ether,
4-chloro-4'-iodo-2-hydroxydiphenyl ether,
4-chloro-4'-fluoro-2-hydroxydiphenyl ether,
4,2'-dichloro-2-hydroxydiphenyl ether,
4,3',4'-trichloro-2-hydroxydiphenyl ether,
4,2',4'-trichloro-2-hydroxydiphenyl ether,
4-bromo-4'-chloro-2-hydroxydiphenyl ether,
4-bromo-2-hydroxydiphenyl ether, and
4-chloro-4'-methoxy-2-hydroxydiphenyl ether.

EXAMPLE V

Fabric made of nylon staply fiber is washed with the liquors prepared according to Example III. The resistance of the treated goods to the growth of bacteria is tested as described in Example I, paragraph (B).

Here also the treated goods proved to be free from *Staphylococcus aureus* SG 511 and *Escherichia coli* 96. The samples are surrounded by a zone on the agar which is clearly free from bacteria.

The following halogen-o-hydroxydiphenyl ethers were tested:

2',4'-dichloro-2-hydroxydiphenyl ether,
2',4',5'-trichloro-2-hydroxydiphenyl ether,
4-chloro-2-hydroxydiphenyl ether,
4,4'-dichloro-2-hydroxydiphenyl ether,
4-chloro-4'-bromo-2-hydroxydiphenyl ether,
4-chloro-4'-iodo-2-hydroxydiphenyl ether,
4,3',4'-trichloro-2-hydroxydiphenyl ether,
4,2',4'-trichloro-2-hydroxydiphenyl ether,
4,2',4',5'-tetrachloro-2-hydroxydiphenyl ether,
4,4'-dichloro-3'-methyl-2-hydroxydiphenyl ether,
4-bromo-4'-chloro-2-hydroxydiphenyl ether,
4-bromo-2-hydroxydiphenyl ether,
4-bromo-2',4'-dichloro-2-hydroxydiphenyl ether,
4,4'-dibromo-2-hydroxydiphenyl ether, and
4-chloro-4'-methoxy-2-hydroxydiphenyl ether.

EXAMPLE VI

A liquor is prepared according to Example IV. Fabric made of nylon staple fibers is treated therein and finished as described in Example III and tested according to Example I, paragraph (B). The treated goods prove to be free from *Staphylococcus aureus* SG 511 and *Escherichia coli* 96. The samples are surrounded by a zone on the agar which is clearly free from bacteria.

The following halogen-o-hydroxydiphenyl ethers were tested:

2',4'-dichloro-2-hydroxydiphenyl ether,
2',4',5'-trichloro-2-hydroxydiphenyl ether,
4-chloro-2-hydroxydiphenyl ether,
4,4'-dichloro-2-hydroxydiphenyl ether,
4-chloro-4'-bromo-2-hydroxydiphenyl ether,
4-chloro-4'-iodo-2-hydroxydiphenyl ether,
4-chloro-4'-fluoro-2-hydroxydiphenyl ether,
4,3',4'-trichloro-2-hydroxydiphenyl ether,
4,2',4'-trichloro-2-hydroxydiphenyl ether,
4-bromo-4'-chloro-2-hydroxydiphenyl ether,
4-bromo-2-hydroxydiphenyl ether, and
4-chloro-4'-methoxy-2-hydroxydiphenyl ether.

EXAMPLE VII

Hand washing test 0.5% (calculated on the weight of the soap) of one of the active substances given in Table I below is incorporated into tablets of toilet soap. This soap cannot be distinguished in appearance from soap not containing active substance. When used, however, it reduces the number of bacteria on the skin, as is demonstrated by the following hand washing test: Groups of people submitting to the test washed their hands with soap containing one of the active substances given below in concentration of 0.5% (calculated on the weight of the soap) according to the following process. The people first washed their hands according to Timetable A five consecutive times with a control soap containing no active substance (control washing).

Timetable A

Each individual person placed his hands for 15 seconds in a wash basin containing 2 liters of sterilized tap water. The hands were soaped for 15 seconds with the control soap containing not active substance, the soap was laid aside and the hands were rubbed for another 45 seconds. The hands were then thoroughly rinsed for 30 seconds in the 2 liters of sterilized tap water mentioned and then dried with a sterile hand towel. This procedure was repeated 5 times using 5 different wash basins each containing 2 liters of sterilized tap water.

The number of bacteria removed from the skin and contained in the 5th rinsing water was tested by putting an adequate amount of rinsing water onto plates, adding 10 ml. of melted nutrient agar to 1 ml. thereof and then leaving the petri dishes containing this mixture for 24 hours at 37°, after which the colonies of bacteria were counted (starting value).

Then, four times daily with 10 hours, i.e. in the morning, before and after the lunch hour and in the evening, each group of persons underwent a controlled hand washing with soap containing active ingredient. In each case, the procedure was as follows:

Timetable B

The conditions required are 15 seconds for moistening the hands, 30 seconds for soaping, 90 seconds for rubbing and 30 seconds for rinsing the hands in 2 liters of tap water.

After 2½ days, i.e. after 10 hand washings according to Timetable B, after a pause of half a day, each person was given a soap containing no active ingredient with which the hands were washed 5 times consecutively according to Timetable A. Again the number of bacteria in the 5th rinsing water was determined, as in the previous control, by testing 1 ml. of the rinsing water for the number of bacteria (2nd control washing). On the following day, the washing with soap containing active substance was continued according to Timetable B. After another 1½ days, i.e. after a further 6 washings according to Timetable B, the active ingredient soap was laid aside and, after a pause of half a day, there was a controlled washing with soap not containing active substance according to Timetable A.

Again, the number of bacteria present in the 5th rinsing water was determined by the method already described (3rd control washing). The reduction in number of bacteria on the skin over a period of 5 days can be determined from the starting value and the numbers of bacteria found after the 2nd and 3rd control washings. In the tests with soaps each containing one of the following halogen-o-hydroxydiphenyl ethers in the concentration of 0.5%, the following values were found:

TABLE I
[Active ingredients used in hand-washing test]

| Active substance | Numbers of bacteria remaining on the skin calculated on the starting value (=1st control washing) (percent) | |
|---|---|---|
| | 2nd control washing | 3rd control washing |
| 4-chloro-2-hydroxydiphenyl ether | 5 | 9.5 |
| 4,4'-dichloro-2-hydroxy diphenyl ether | 3 | 7.5 |
| 4,3',4'-trichloro-2-hydroxydiphenyl ether | 20 | 22 |
| 4,2',4'-trichloro-2-hydroxydiphenyl ether | 47 | 13 |

EXAMPLE VIII

Fingerprint test

The activity of toilet soaps produced according to the Example VII, paragraph 1, against bacteria was tested in the following way: Two agar plates I were prepared one of which had been inoculated with 24 hour old cultures of Staphylococcus aureus SG 511 and the other with 24 hour old cultures of Escherichia coli 96. The same was done with two agar plates II. There was no difference in the appearance of agar plates I and II. The hands were washed by the following method: each person had 2 wash basins each containing 2 liters of tap water. Both hands were placed in basin 1 for 10 seconds and then the hands were made more or less dry by rubbing them for 30 seconds. The finger tips of the index and middle finger of the right hand were then placed for 30 seconds on the agar plate I which had been inoculated with Staphylococcus aureus SG 511. At the same time, the finger tips of the index and middle fingers of the left hand were placed for 30 seconds on the agar plate I which had been previously inoculated with Escherichia coli 96. The hands were then dipped in a first wash basin for 10 seconds. The hands were soaped for 15 seconds with a soap containing one of the following active substances, massaged for another 45 seconds and rinsed for 15 seconds in the first basin, whereupon the hands were rinsed in a second basin for 15 seconds. The hands were then shaken and rubbed for 30 seconds in order to remove as much excess liquid as possible. Then the index and middle fingers of the right hand were placed on the agar inoculated with Staphylococcus aureus SG 511, agar plate II and those of the left hand were placed on agar plate II inoculated with Escherichia coli 96, for 30 seconds. The agar plates I and II containing the finger prints were left for 24 hours at 37°. Exactly as many colonies of bacteria grew on agar plates I where the fingers had rested as on where they had not. At and around the places where the fingers had rested on agar plates II there were no colonies of the active ingredient in the soap had a bactericidal action which remained on the skin of the finger tip through the washing process.

The following halogen-o-hydroxydiphenyl ethers prevented the growth of the bacteria mentioned on the places where the fingers had rested:

4,4'-dichloro-2-hydroxydiphenyl ether,
4-chloro-4'-bromo-2-hydroxydiphenyl ether,
4-chloro-4'-iodo-2-hydroxydiphenyl ether,
4-chloro-2-fluoro-2-dihydroxydiphenyl ether,
4,3',4'-trichloro-2-hydroxydiphenyl ether, and
4,2',4'-trichloro-2-hydroxydiphenyl ether.

EXAMPLE IX

Cotton cambric is treated for 20 minutes at 30° in a dry cleaning solution consisting of pure trichloroethylene which contains 2.5 mg./liter of 4,4'-dichloro-2-hydroxydiphenyl ether (liquor ratio 1:20). The cotton fabric is then passed, between filter paper, through a mangle and hung up in the air to dry.

The treated goods were tested as to their resistance to the growth of bacteria as described in Example I, paragraph (B). The tests showed complete absence of Staphylococcus aureus SG 511 and Escherichia coli 96. The samples of fabric were encircled by a clear bacteria-free zone on the agar.

A similarly good bactericidal activity is attained in the above dry cleaning if 1 g. of water and 5 g. of the alkali metal salts of higher fatty acids as cleaning strengthener are added per liter to the trichloroethylene and 5 mg. per liter of 4,4'-dichloro-2-hydroxydiphenyl ether are used.

2.5 mg./liter of 4,2',4'-trichloro-2-hydroxydiphenyl ether can be used as active ingredient in this example with the same success as 2.5 mg./liter of 4,4'-dichloro-2-hydroxydiphenyl ether.

EXAMPLE X 200 parts of polyamide 6 and 1 part of 4,4'-dichloro-2-hydroxydiphenyl ether are mixed in a dry state in a mixing apparatus for 10 to 15 minutes and then the mixture is put into an injection moulding machine fitted with a conical screw which acts as ejection piston and the mixture is injected into plates of 55 x 36 mm. and 1.2 mm. thickness at 260°.

Circular samples of 5 mm. diameter are cut from the polyamide plates and these are tested as to their resistance to bacteria as described in Example I, paragraph (B), for textile samples. The treated goods showed complete absence of *Staphylococcus aureus* SG 511 and *Escherichia coli* 92. There is a clear bacteria-free zone encircling the samples on the agar.

EXAMPLE XI 65 parts of polyvinyl chloride powder, 35 parts of dibutyl sebacate and 2 parts of dibutyl tin dilaurate are mixed with 0.5 part of 4,4'-dichloro-2-hydroxydiphenyl ether, the mixture is homogenized on a set of mixing rollers for 10 minutes at 160° and then drawn into foils of 0.3 mm. thickness.

Circular samples of 20 mm. diameter are cut from the foils so produced and these are tested as to their resistance to bacteria as described in Example I, paragraph (B), for textile samples.

The treated goods showed complete absence of *Staphylococcus aureus* SG 511 and *Escherichia coli* 92. There is a clear bacteria-free zone encircling the samples on the agar.

EXAMPLE XII

In 200 g. of viscose containing 9.0% cellulose, 0.8% of 4,2',4'-trichloro-2-hydroxydiphenyl ether (calculated on the weight of the cellulose) are added from a 6% sodium hydroxide stock solution and mixed into the viscose for 20 minutes. Air is then removed from the viscose whereupon viscose films are produced in the known way, washed, desulfurized and dried. Circular samples of 20 mm. diameter are cut from the viscose films and these are tested as to their resistance to bacteria as described in example, paragraph (B), for textile samples.

The treated goods showed complete absence of *Staphylococcus aureus* SG 511 and *Escherichia coli* 92. There is a clear bacteria-free zone encircling the samples on the agar.

0.8% of 4-bromo-2',4'-dichloro-2-hydroxydiphenyl ether can be used in this example as active ingredient with the same success.

EXAMPLE XIII

A concentration of 100 mg./liter of one of the following active ingredients (which for easier dispersion has been dissolved in ethylene glycol monomethyl ether in a ratio of 1 part of active ingredient to 20 parts of solvent) is added to a washing liquor which contains 1.5 g. of sodium soap per liter. Cotton cambric is introduced into this liquor (liquor ratio 1:20) and the bath is heated to 90°. The textile is treated for 20 minutes at this temperature, then rinsed twice at 40° for 3 minutes each time with permutite water (liquor ratio 1:20), centrifuged, dried and ironed.

The treated goods were tested as to their resistance to the growth of bacteria as described in Example I, paragraph (B), and showed complete absence of *Staphylococcus aureus* SG 511 and *Escherichia coli* 96. There was a clear bacteria-free zone around the samples on the agar.

The following halogen-o-hydroxydiphenyl ethers and halogen-acyloxy-diphenyl ethers were tested:

4-chloro-4'-acetyl-2-hydroxydiphenyl ether,
4,4'-dichloro-2'-cyano-2-hydroxydiphenyl ether,
4,4'-dichloro-2'-amino-2-hydroxydiphenyl ether,
4,4'-dichloro-2-acetoxy-diphenyl ether,
4,4'-dichloro-2-chloroacetoxy-diphenyl ether,
4,4'-dichloro-2-methylcarbamyloxy-diphenyl ether,
4,4'-dichloro-2-benzoyloxy-diphenyl ether,
4,4'-dichloro-2-(4''-chlorobenzoyloxy)-diphenyl ether, and
4,4'-dichloro-2-methylsulfonyloxy-diphenyl ether.
4,4'-dichloro-2-(chlormethylsulfonyloxy)-diphenyl ether.

The antimicrobial compositions according to the invention contain at least one compound of the Formulas IA/B to V inclusive as active ingredient together with the usual pharmaceutical carriers. The type of carriers depends to a great extent on the intended use. Ointments, powders and tinctures are used in particular for external application, for example for the disinfection of healthy skin and also for the disinfection of wounds and for the treatment of dermatoses and affections of the mucous membranes which are caused by bacteria or fungi. The ointment bases can be anhydrous, e.g. they can consist of mixtures of wool fat and soft paraffin, or they can consist of aqueous emulsions in which the active substance is suspended. Suitable carriers for powders are, e.g. starches, such as rice starch, the bulk weight of which if desired, can be made lighter, e.g. by the addition of highly dispersed silicic acid or heavier by the addition of talcum. Tinctures contain at least one active ingredient of the Formulas IA/B to V in aqueous ethanol in particular 45–75% ethanol to which, if desired, 10–20% glycerin can be added. Solutions prepared from the usual solubility promoters such as, e.g. polyethylene glycol, and also optionally, from emulsifying agents, are used in particular for the disinfection of healthy skin. The content of active ingredient in the above forms for external application is preferably between 0.1 and 5%.

Gargles or concentrates for the preparation thereof and also tablets for slow dissolution in the mouth are suitable for the disinfection of the mouth and throat. The former are prepared in particular from alcoholic solutions containing about 1–5% of active substance to which glycerin and/or flavourings can be added. Lozenges, i.e. solid dosage units, have a relatively high content of sugar or similar substances and a relatively low content of active substance of about 0.2–20%, as well as the usual additives such as binding agents and flavourings.

Tablets, dragés (sugar coated tablets) and capsules are used in particular for intestinal disinfection and for the oral treatment of infections of the urinal tract. These preferably contain between 10% and 90% of an active substance of the general formula I to enable the adminstration of daily doses of between 0.1 and 2.5 g. to adults or of suitably reduced doses to children to be made. Tablets and dragée cores are produced by combining the active substances of the general Formula I with solid, pulverulent carriers such as lactose, saccharose, sorbitol, maize starch, potato starch or amylopectin, cellulose derivatives or gelatines, preferably with the addition of lubricants such as magnesium or calcium stearate or polyethylene glycols of suitable molecular weight.

Dragée cores are then coated, for example, with concentrated sugar solutions which can also contain, e.g. gum arabic, talcum and/or titanium tioxide, or they are coated with a lacquer dissolved in volatile organic solvents or mixture of solvents. Dyestuffs can be added to these coatings, e.g. to differentiate between varying dosages. Soft gelatine capsules and other closed capsules consist, for example, of a mixture of gelatines and glycerine and contain, e.g. mixtures of an active ingredient of the general Formula I with polyethylene glycol. Hard gelatine capsules contain, for example, granulates of an active substance with solid pulverulent carriers such as, e.g. lactose, saccharose, sorbitol, mannitol; starches such as potato starch, maize starch or amylopectin, cellulose derivatives or gelatines, as well as magnesium stearate or stearic acid.

In all forms for administration, compounds of the aforsaid formulas can be present as sole active ingredient or they can also be combined with other known antimicrobial, in particular antibacterial and/or antimycotic, active substances, for example to broaden the range of application. Also, carriers which themselves have favourable pharmacological properties may be used such as, e.g. sulfur as a powder base or zinc stearate as a component of ointment bases.

The following examples give a number of typical forms of application but the invention also embraces the choice of different amounts of components as well as other usual carriers and additives. 2-hydroxy-4,4'-dichlorodiphenyl ether ($\alpha$), 2-hydroxy-4,2',4'-trichlorodiphenyl ether ($\beta$), or 2-acetoxy-4, 4'-dichloro-diphenyl ether ($\gamma$) are used as active ingredients in Examples XIV to XXIV, depending on the Greek letter given after each of these examples.

EXAMPLE XIV (α)

Hand disinfectant

A solution of 3.00 g. of active substance and 3.00 g. of sodium sulforicinoleate in 47.00 g. of polyethylene glycol 400 is prepared and also 7.00 g. of sodium dodecyl sulfate are dissolved in 39.85 g. of water. The two solutions are mixed and 0.15 g. of perfume are added to the mixture. The liquid obtained is dropped or sprayed onto the hands and rubbed in.

EXAMPLE XV (β)

Wound dusting powder 3.00 g. of active substance, 5.0 g. of zinc oxide and 41.9 g. of rice starch are thoroughly mixed with 50.0 g. of talcum which has been impregnated with 0.1 g. of perfume. The mixture is passed through a suitable sieve and again well mixed.

EXAMPLE XVI (α)

Antiseptic ointment 3.0 g. of active ingredient are rubbed with 3.0 g. of paraffin oil, the mixture is melted at a moderate temperature and 10.0 g. of wool fat and 84.0 g. of white soft paraffin are added. The mixture is allowed to cool while stirring.

EXAMPLE XVII (α)

Lozenges for the disinfection of the mouth and throat: 50.0 g. of active substance are carefully mixed with 400.0 g. of castor sugar and the mixture is evenly wetted out with a granulating solution of 8.0 g. of gelatine and 2.0 g. of glycerin in about 120 g. of water. The mass is granulated through a suitable sieve and dried. A sieve mixture of 3.0 g. of highly dispersed silicic acid, 4.0 g. of magnesium stearate, 0.7 g. of flavouring and 42.3 g. of talcum is added to the dry granulate, thoroughly mixed in and the mixture is pressed into 1000 tablets.

EXAMPLE XVIII (β)

Gargle concentrate 5.0 g. of active substance are dissolved in 60.0 g. of 96% ethanol, 15.0 g. of glycerin and 0.3 g. of flavouring are added and the solution is made up to 100.0 g. with 19.7 g. of distilled water. For gargling, 5–20 drops of this concentrate are used in water.

EXAMPLE XIX (α)

Tablets for the disinfection of intestines and urinal tract: To prepare 1000 tablets each containing 150 mg. of active substance, first 150.0 g. of active substance are thoroughly mixed with 60.0 g. of maize starch and 35.0 g. of lactose and the mixture is evenly wetted out with a granulating solution prepared from 5.0 g. of gelatine and 3.0 g. of glycerin in about 70 g. of water. The mass is granulated throuhg a suitable sieve and dried. The granulate is thoroughly mixed with a sieved mixture of 15.0 g. of talcum, 10.0 g. of dried maize starch and 2.0 g. of magnesium stearate and the mixture is pressed into 1000 tablets.

EXAMPLE XX (γ)

Dragée for the disinfection of the intestines and urinal tract: to prepare 1000 dragée cores, first 150.0 g. of active substance are throughly mixed with 60.0 g. of maize starch and 34.0 g. of distilled water and the mass obtained is granulated through a suitable sieve and dried. The granulate is thoroughly mixed with a sieved mixture of 15.0 g. of talcum, 10.0 g. of maize starch and 2.0 g. of magnesium stearate and the mixture is pressed into 1000 dragée cores each weighing 280 mg.

Coating is carried out in the coating pan with a mixture consisting of: 2,000 g. of shellac, 7.500 g. of gum arabic, 0.180 g. of dyestuff, 2,000 g. of silicic acid, 35.00 g. of talcum and 58.320 g. of sugar.

1000 dragées are obtained each weighing 385 mg. and containing 150 mg. of active substance.

EXAMPLE XXI

To a detergent composition liquifiable at high temperatures and composed of

| | Grams |
|---|---|
| Sodium soap based on lauric, myristic and palmitic acid | 40 |
| Sodium tripolyphosphate | 30 |
| Tetrasodium pyrophosphate | 5 |
| Sodium silicate | 4 |
| Magnesium silicate | 3 |
| Tetrasodium salt of ethylene diamine tetraacetic acid | 0.5 |
| Sodium carbonate | 5 |
| Sodium sulfate | 5.5 |
| Water | 70 | there are added at 85 to 90°

| | |
|---|---|
| 1 - (3'-chlorophenyl) - 3-(4''-chlorophenyl)-pyrazoline | 0.2 |
| 4,2',4'-trichloro-2-hydroxy-diphenylether | 1.0 |

The components are thoroughly mixed and then dried in the spray tower. A spreadable disinfectant detergent is obtained.

When 100 g. of undyed mixed polyamide cotton fabric are washed at a bath ratio of 1:20 for 20 minutes in a 60° warm wash liquor containing 16 g. of the above-described detergent and are then rinsed and dried, the washed mixed fabric has a brilliant white appearance in daylight and is protected against the growth of bacteria thereon for a considerable period of time.

EXAMPLE XXII 200 g. of soap powder, consisting of

| | Percent |
|---|---|
| Mixture of the sodium salt of tallow fatty acid and sodium salt of coconut oil fatty acid (weight ratio 70:30) | 88.0 |
| Almond oil | 2.0 |
| Perfume | 1.0 |
| Titanium dioxide | 0.2 |
| Glycerol | 0.5 |
| Tetrasodium salt of ethylene diamine tetraacetic acid | 0.05 |
| Optical brightener (as in Example XXI) | 0.05 |
| 4,2',4'-trichloro-2-hydroxy-diphenol ether | 2.0 |
| Water | 6.2 | together with 400 ml. of water are worked at 80° into a homogeneous mass and then dried at 70 to 80° in vacuo. A brightened disinfectant soap material is obtained which can be formed into pieces or ground into a powder.

EXAMPLE XXIII 99.2 g. of a heavy-duty non-soap detergent of the Syndet type consisting of

| | Grams |
|---|---|
| Dodecyl benzene sulfonate | 15.2 |
| Sodium salt of lauryl alcohol sulfonic acid ester | 3.8 |
| Sodium tripolyphosphate | 25.6 |
| Tetrasodium pyrophosphate | 7.6 |
| Sodium silicate | 4.0 |
| Magnesium silicate | 1.9 |
| Sodium carbonate | 5.0 |
| Carboxymethylcellulose | 1.4 |
| Tetrasodium salt of ethylene diamine tetraacetic acid | 0.3 |
| Sodium sulfate | 34.4 | are mixed with 100 g. of water to form a homogeneous slurry. To this mixture are added 0.1 g. of 4,4'-bis[4'', 6'' - diphenylamino - 1'',3'',5''-triazinyl-(2'')-amino]-stilbene-2,2'-disulfonic acid and 0.05 g. of 1-(3'-fluorophenyl)-3-(4''-chlorophenyl)-pyrazoline, as well as 1 g. of 4,2′,4′-trichloro-2-hydroxy-diphenylether, the whole is mixed well and then dried in the spray tower;

100 g. of laundry consisting of 30 g. of undyed nylon fabric and 70 g. of undyed cotton fabric are washed for 10 minutes at 85° in a wash liquor containing 8 g. of the above-described brightening detergent and having a bath ratio of 1:10. Then the goods are rinsed and dried. This washing process renders both types of fabric resistant to the growth of bacteria for a considerable length of time.

EXAMPLE XXIV

A detergent mixture consisting of

| | Parts |
|---|---|
| Tallow soap | 6.0 |
| Dodecyl benzene sulfonate | 6.0 |
| The condensation product of nonylphenol and ethylene oxide (molar ratio 1:8.5) | 6.0 |
| Sodium tripolyphosphate | 40.0 |
| Tetrasodium salt of ethylene diamine tetraacetic acid | 0.2 |
| Sodium silicate | 8.0 |
| Magnesium silicate | 2.0 |
| Sodium perborate ($NaBO_3 \cdot 4H_2O$) | 15.0 |
| Carboxymethyl cellulose | 2.0 |
| Disodium 4,4′-bis-[4″ - ($\beta$-methoxyethylamino)-6″-phenylamino - 1″,3″,5″ - triazinyl(2″)-amino]-stilbene-2,2′-disulfonate | 0.2 |
| 4,2′,4′-trichloro - 2 - hydroxy-diphenyl ether | 1.0 | is produced in the following manner: the optical brightener is intimately mixed with normal aqueous sodium hydroxide solution (10 ml. per gram of brightener) and when the brightener is thoroughly dispersed, about 200 to 300 ml. of water (per gram of brightener) are added.

The other ingredients of the detergent mixture are mixed with each other separately and intimately using a sufficient amount of water to obtain a creamy paste, the latter is dried at 60° and granulated.

The detergent granules are then added to the slurry of brightener and the mixture is repeatedly and thoroughly stirred until a smooth, creamy mix is obtained. The resulting slurry is then spread into a uniform layer on a flat surface and dried in an oven at 85° for 16 hours. The resulting cake is allowed to cool to room temperature, left standing for at least 30 minutes and then crushed and placed in a dessicator. The dried chunks of detergent mixture are then forced through a 20 mesh screen and, if desired, the resulting powder is transferred to 60 mesh screen to remove the fine portion.

A detergent mixture is obtained which brightens textile materials washed therewith and, at the same time, renders them resistant to bacterial growth for a considerable length of time.

EXAMPLE XXV 10 parts of cotton cretonne are washed for 20 minutes with stirring in 200 parts of an aqueous wash liquor containing 1.5 g. of Marseille soap per liter and having a temperature of 65°.

The cotton fabric is then taken out of the wash liquor and rinsed twice, each time in 200 parts of water of 40° for 3 minutes; the fabric is then introduced into 200 parts of an aqueous liquor having a temperature of 40° and containing 0.4 part of the bacteriostatic softening agent, produced as described below, and 0.01 part of 4,2′,4′-trichloro-2-hydroxy-diphenyl ether and is lightly stirred therein for 10 minutes. Thereupon, the cotton cretonne is removed from the aqueous liquor and air-dried. The fabric then shows a soft handle, and, in addition, inhibits the growth of bacteria thereon.

Production of bacteriostatic softener 86.7 g. of commercially available di-(hydrogenated tallow)dimethyl-ammoniumchloride fabric softener consisting of a mixture of

| | Parts |
|---|---|
| Di-hexadecyl - dimethyl-ammoniumchloride | 18 |
| Di-octadecyl - dimethyl-ammoniumchloride | 56.25 |
| Di-octadecenyl - dimethyl-ammoniumchloride | 0.75 |
| Isopropanol | 18 |
| Water | 6.5 |
| Sodium chloride | 0.5 | are heated with stirring at a temperature of 45–50°, 3.7 g. of 4,2′,4′-trichloro-2-hydroxy-diphenyl ether are added and the whole is stirred for 30 minutes. The temperature is then raised to 55–60° and warm water is added to make up a total weight of 1000 g.

A stronger bacteriostatic effect is obtained when using 7.5 g. in lieu of 3.7 g. of the above bacteriostat in the above composition.

EXAMPLE XXVI 10 parts of cotton cretonne are washed for 20 minutes with stirring in 200 parts of an aqueous wash liquor containing 1.5 g. of Marseille soap per liter and having a temperature of 65°.

The cotton fabric is then taken out of the wash liquor and rinsed twice, each time in 200 parts of water of 40° for 3 minutes; the fabric is then introduced into 200 parts of an aqueous liquor having a temperature of 25° and containing 0.4 part of the bacteriostatic rinsing bath, produced as described below, and is lightly stirred therein for 10 minutes. Thereupon, the cotton cretonne is removed from the aqueous liquor, hydroextracted and air-dried. The fabric then inhibits the growth of bacteria thereon.

Production of bacteriostatic rinsing bath

To the last mentioned rinsing bath there are added, per liter thereof, 2 ml. of 80%-acetic acid and 0.25 ml. of a mixture consisting of

| | Parts |
|---|---|
| 4,2′,4′-trichloro-2-hydroxy - diphenylether | 20 |
| Sodium hydroxide | 10 |
| Sulfonated ricinoleic acid | 7 |
| Permutite-softened water | 63 |

EXAMPLE XXVII

An aerosol dispenser is filled with an aqueous formulation consisting of 2 parts of the compound of the formula

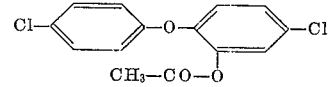

and 18 parts of isopropanol, and 80 parts of a mixture of Freon 11 and Freon 12 in a weight ratio of 1:2, as propellant gas.

Into a room of about 20 cubic meter volume the air therein having a temperature of about 20° there are placed the following bacterial carriers:

(a) Ceramic tiles of 2 cm. by 2 cm. surface part of the tiles having been previously dipped into a suspension of *Staphylococcus aureus* and another part into a suspension of *Escherichia coli*, (b) Circular patches of cotton having a diameter of 5 cm. and having been dipped into the aforesaid two bacterial suspensions, (c) Sterile petri dishes each containing 15 ml. of nutrient agar (Difco, see Difco Manual, 9th ed., 1964, p. 32), 0.03% of polyoxyethylene sorbitan mono-oleate (tween 80) and 0.005% of potassium tellurite, (d) Petri dishes each containing 15 ml. of nutrient according to MacConkey (Difco Manual, ibidem, p. 131), the petri dishes being placed open on the floor of the room.

The room is then sprayed three times successively with 8 ml. of the above aersol formulation.

In order to test the bacteriostatic effectiveness of the said formulation, petri dishes are closed and removed from the room after 30 minutes, 60 minutes and 120 minutes, respectively, and incubated at 37° C. for 48 hours.

Ceramic tiles removed from the room after 30, 60 and 120 minutes, respectively, are immersed each into 20 ml. of physiological sodium chloride solution, to which 0.03% calculated on the weight of the solution of Tween 80, has been added as a blocking agent for the bacteriostatically active substance. From the resulting well mixed solution, 1 ml. is used for inoculation of 20 ml. of sterile nutrient agar and 10 ml. of MacConkey agar, and the solidified dishes are then incubated at 37° C. for 48 hours.

The textile patches are each placed on sterile nutrient agar and sterile MacConkey agar and incubated at 37° C. for 48 hours.

These tests reveal a complete removal of germs from the air in the sprayed room after 30 minutes, and show complete inhibition of bacterial growth on the ceramic tiles after 30 to 60 minutes, depending on the location of the tiles in the room, and complete inhibition of bacterial growth on the textile patches after 60 to 120 minutes, depending on their location in the said room.

EXAMPLE XXVIII

A hard surface cleaner is prepared by mixing intimately with each other

| | Parts |
|---|---|
| 4,2′,4′-trichloro-2-hydroxy-diphenyl ether | 2 |
| Sodium dodecylbenzene sulfonate | 4 |
| Calcined sodium carbonate | 8 |
| Sodium silicate (water glass) | 3 |
| Sodium tripolyphosphate | 5 |
| Diatomaceous earth | 78 |

Ceramic surfaces, varnished table surfaces, metal surfaces, e.g. of copper or brass, and the like can be cleaned, e.g. by rubbing the hard surface cleaner on such surfaces with a soft cloth. Not only are the thus cleaned surfaces germ-free but also the same cloth can be used successively on different surfaces without danger of thereby transferring germs from a preceding to a subsequently treated surface.

That the active ingredients of the Formulas II to V are suitable especially for the prevention and cure of infections of the urinal tract of warm-blooded animals on oral application by effectively combatting the growth of pathogenic fungi therein, can be seen, for example, from the following tests:

(a) Determination of the elimination of bacteriostatically active urine: Albino mice weighing from 18–22 g. are injected in the morning with 1 ml. of physiological sodium chloride solution intraperitoneally. The urine is then collected for 2 hours in a metabolic cage. The substance to be tested is then administered per os and the urine is again collected over a period of 4 hours. The test is repeated on the following day with the same mice. To determine the bacteriostatic activity of the urine, nutrient agar is mixed with a suspension of *Staphylococcus aureus* or *Escherichia coli* and the mixture is poured into plates. After it has solidified, holes are made in the agar and each is filled with 0.1 ml. of urine. The plates are stored for 24 hours at 37° C. whereupon the diameter of the zones in which growth is inhibited is measured. After administration of 10 mg. per kg. bodyweight of 2-hydroxy-4,4′-dichlorodiphenyl ether, 2-hydroxy-4,2′-dichlorophenyl ether or 2-hydroxy-4,2′-dichlordiphenyl ether or 2-hydroxy-4,2′, 4′-trichlorodiphenyl ether per os, diameters of inhibited zones on plates containing *Staphylococcus aureus* of 22–32 mm. could be determined and on plates containing *Escherichia coli* 86 they were 19–26 mm.

(b) Activity against experimental cystopyelitis in the rat: The tests were made by the method described by D. J. N. Hossack, Brit. J. Pharmacol. 19, 306–312 (1962), entitled "Proteus Vulgaris Urinary Tract Infections in Rats; Treatment With Nitrofuran Derivatives." In this test a clear therapeutical action could be determined. For example, with a daily dosage of 100 mg. of 2-hydroxy-4,4′-dichlorodiphenyl ether per kg. bodyweight per os, all 5 treated animals survived the duration of the test, i.e. 30 days, whereas of 9 control animals, only two survived.

As has already been mentioned, the active ingredients usable according to the invention are only slightly toxic; the $DL_{50}$ on oral administration to the mouse is, in general near to or over 5 g. per kg. bodyweight.

Similar tests to those carried out under (a) above also revealed an unexpected, desirable prolongation of the antibacterial activity of acyl derivatives of Formula II compared with that of corresponding compounds falling under Formula II in which Z is hydrogen.

These tests were carried out on the first day exactly as described under (a) above, while, on the second day, urine was collected for four hours prior to administration of the test substance as well as for four hours after such administration.

A significant difference was found especially in the residual effectivity of 4,4′-dichloro-2-acetoxy-diphenyl ether against *Escherichia coli*, while 4,4′-dichloro-2-hydroxy-diphenyl ether showed no such prolonged activity.

The results obtained with these two compounds of *Escherichia coli* inoculated on agar and incubated in the same manner as described above under Test (a) are given in the table below:

TABLE II

| | Dosis, mg./kg. p.o. | Inhibited zone (diameter in mm.) (administration) | | | |
|---|---|---|---|---|---|
| | | 1st day | | 2nd day | |
| | | Before | After | Before | After |
| 4,4′-dichloro-2-hydroxydiphenyl ether | 10 | 0 | 27 | 0 | 22 |
| 4,4′dichloro-2-acetyloxydiphenyl ether | 10 | 0 | 24 | 19 | 20 |

When the new active ingredients of Formulas IV and V are to be used for controlling phytopathogenic fungi, they are made up, optionally in the form of their salts, into fungicides which are suitable for the protection of plants and parts thereof such as blossom, seeds, fruit, roots, stalks and foliage, from attack by fungi.

The new fungicides of Formula I in the form of so-called seed dressings give seeds treated therewith a good protection, particularly from attack by *Alternaria tenuis* and *Botrytis cinerea*.

The following examples serve to illustrate this aspect of the invention. Where not expressly mentioned otherwise, parts and percentages are given by weight; the temperatures are given in degrees centigrade.

Spore germination test

The growth-inhibiting activity of a preferred active ingredient falling under Formula I on fungi was determined by a spore germination test with spores of *Alternaria tenuis* and spores of *Botrytis cinerea*, and compared with that of a known isomeric compound, 2′,4-dichloro-2-hydroxy-diphenylether.

1 cc. of a 0.1% and a 0.01%-acetone solution respectively, of each active ingredient is placed on glass slides (26 x 76 mm.) under the same conditions. The solvent is evaporated off and a uniform coating of active ingredient is obtained on the glass slides. The slides are inoculated with fungi spores and are then kept in petri dishes at room temperature in an atmosphere which is almost saturated with steam. After 2–3 and 4–6 days, the germinated spores are counted.

The concentrations of active ingredient are given in the following table which inhibit at least 90% germination.

+ in the following table shows an at least 90% inhibition of germination effected by the residue of 1 cc. of a 1% acetone solution of active ingredient;

++ shows an at least 90% inhibition of germination attained by the residue of 1 cc. of a 0.1% acetone solution of the active ingredient, but practically no inhibition of germination when applying 1 cc. of 0.01% acetone solution;

+++ shows the same effect attained by the residue of 1 cc. of 0.1% acetone solution, and about 30-50% inhibition when applying 1 cc. of 0.01% acetone solution.

TABLE

| Active ingredient | Alternaria tenuis | Botrytis cinerea |
|---|---|---|
| 4,4'-dichloro-2-hydroxydiphenyl ether | +++ | ++ |
| 2,4'-dichloro-2-hydroxydiphenyl ether | ⊕ | ⊕ |

At these concentrations of the active ingredients, even relatively sensitive plants such as tomatoes or vetch remain practically undamaged, while at higher concentrations—e.g. when applying in the aforesaid test 1%-acetone solutions of the active ingredients—these plants show severe damage.

Antifungal agents are produced by methods known per se by intimately mixing and milling the active substances of general Formula I with suitable carriers optionally with the addition of adhesives, dispersing agents or solvents which are inert to the active substances. These agents can be used in the following forms:

Solid forms: dusts, sprinkling agents, granulates (coated granules, impregnated granules, homogeneous granules), Water dispersible concentrates of active substances: wettable powders, pastes, emulsions, solutions, and Liquid forms: forms for the production of aerosols, fogs and fumigants.

To produce the solid forms for use (dusts and sprinkling agents, granulates), the active substances are brought on to solid carriers such as talcum, kaolin, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, milled plastics, fertilisers such as ammonium sulphate, ammonium phosphates, ammonium nitrates, urea etc., and also ground nutshells, cellulose powder, residues of plant extractions, active charcoal etc. These carriers can be used alone or admixed with each other.

The particle size of the carriers is, for dusts up to about $100\mu$, for sprinkling agents from about $75\mu$-0.2 mm. and for granulates from 0.2 mm.-1 mm. (and coarser).

As a general rule, the concentrations of active substances in the solid preparations is from 0.5-80%.

To these mixtures can also be added additives which stabilise the active substance and/or non-ionic, anionic and cationic surface active substances which, for example, improve the adhesion of the active substances on parts of plants (glues, adhesives) and/or attain better wettability (wetting agents) and dispersibility of the active substances. Examples of such surface active substances are as follows: olein plus hydrate of lime, cellulose derivatives suitable for the preparation of aqueous solutions of a medium degree of viscosity (methyl celluloses, carboxymethyl celluloses, hydroxyethyl celluloses), galactomans (guar gum), their anionic and cationic derivatives, polyethylene glycol ethers of mono- and di- alkyl phenols having 5-15 ethyleneoxide radicals per molecule and 8-9 carbon atoms in the alkyl radical (the commercial products known under the names "Triton," "Igepal," "Tergitol," etc.), condensation products of ethylene oxide/propylene oxide (medium molecular weight of the polyoxypropylene part: 1750; e.g. the commercial products known by the name "Pluronics"), solid, liquid sulphite waste liquor, alkali metal and alkaline earth metal salts thereof, mineral oils and polyethylene glycol ethers (Carbowaxes), fatty alcohol polyethylene glycol ethers (having 5-20 ethylene oxide radicals per molecule and 8-18 carbon atoms in the fatty alcohol moiety; e.g. the commercial products known by the name "Genapol"), also dextrins caseins, their calcium salts, proteins, polyvinyl pyrrolidones, polyvinyl alcohols (e.g. the commercial product known as "Moviol"), condensation products of urea-formaldehyde and also latex products etc.

In some cases it is necessary to add to these forms for application, plant, animal and mineral oils as penetrating agents, i.e. agents which help and improve the penetration of the active substance into the plants or parts thereof.

The concentrates of active substance which can be dispersed in water: wettable powders, pastes and emulsion concentrates, are agents which can be diluted with water to any concentration desired for application to plants and parts thereof. They consist of active substance, carrier, additives which stabilise the active substance, surface active substances, protective colloids and anti-foam agents and, optionally, solvents. The concentration of active substance in these agents is 5-80%.

Wettable powders and pastes are obtained by mixing and milling the active substances with surface active substances and pulverulent carriers in suitable mixers and milling machines until homogeneity is attained. Carriers are, for example, those mentioned in the paragraph dealing with solid forms for application. In some cases it is advantageous to use mixtures of carriers. By surface active substances, glues or adhesives, wetting and dispersing agents and protective colloids are to be understood. Of the glues and adhesives already mentioned, because of their properties a number thereof can be used as so-called auxiliary dispersing agents. Other dispersing agents and wetting agents which can be used are: condensation products of naphthalene and derivatives thereof with phenol and formaldehyde (the commercial products known as "Irgatan"), also aluminium salts of lignin sulphonic acids, further alkylaryl sulphonates, alkali metal salts and alkaline earth metal salts of dibutyl naphthalene sulphonic acid, fatty alcohol sulphates such as water soluble salts of sulphated hexadecanols, heptadecanols, octadecanols, octadecenols, the sodium salt of sulphated hexadecyl glycol ethers (the commercial products known as "Eriopon"), the sodium salt of oleyl methyl tauride (the commercial products known as "Arkopon"), ditertiary acetylene glycols (the commercial products known as "Surfynol"), dialkyldilauryl ammonium chloride (the commercial product known as "Aliquat"), and fatty acid alkali metal and alkaline earth metal salts.

Example of anti-foam agents are: silicones, Antifoam A etc.

The active substances are so mixed, milled, sieved and strained with the additives mentioned above that the solid particle size in wettable powders and in pastes is not more than $20-40\mu$ and $3\mu$ respectively. To produce emulsion concentrates and pastes, liquid dispersing agents such as those given in the previous paragraphs, organic solvents and water are used. Examples of solvents are as follows: alcohols, benzene, toluene, xylenes, dimethyl sulphoxide, dimethyl formamide and mineral oil fractions boiling between 120 and 350°. The solvents must be almost without smell not phytotoxic, inert to the active substances and not easily inflammable.

The forms for application which can be dispersed in water can also contain other additives to increase the stability to light, penetrating agents, anti-foam agents and also synergists.

The wettable powders, pastes and emulsion concentrates are diluted with water to the practical concentrations desired which are between 0.01 and 2%, calculated on the active substance. In the composition and concentration for use described, these application forms have good suspendibility which can be further improved, e.g. by the addition of synthetic voluminous silicic acid. The emulsifiable property of the emulsion concentrates is also very good.

In addition, the agents according to the invention can be in the form of solutions or sprays. For this purpose an active substance of general Formula I can be dissolved in suitable organic solvents, mixtures of solvents or in water. Higher aliphatic and aromatic hydrocarbons, chlorinated derivatives thereof, alkyl naphthalenes alone or mixed with each other or with water can be used as organic solvents. The solutions contain the active substance in a concentration from 1 to 20%. They are used in the form of spray or mist with suitable spraying or mist blowing equipment.

Aerosols are produced from solutions of the active substances by the addition of propellants; aerosols are particularly suitable for use in the house and garden. Both the solutions and the aerosols can contain vegetable, animal and mineral oils to increase the adhesion and penetration and also additives to improve the resistance to rain and light.

Also, the active substances of general Formula I can be worked up with a combustible substance, e.g. sawdust or paper and a source of oxygen such as potassium chlorate and potassium nitrate, to form a fumigant or fumigant paper.

The application forms described can be mixed very well with other biocidally active compounds or agents containing such compounds. Thus, to broaden the range of action, other fungicides, also insecticides, bactericides, fungistatics, bacteriostatics or nematicides can be present together with the active substances of general Formula I. The active substances of general Formula I can also be used with fertilisers, plant hormones etc.

The following examples described the production of various ready-for-use forms for application containing the active substances of general Formula I. Parts are given therein as parts by weight.

DUST

Components (a) Parts
- 4,4'-dichloro-2-hydroxy-diphenylether _____ 10
- Highly dispersed silicic acid _____ 5
- Talcum _____ 85

(b)
- 3-tetradecylamino-azacycloheptane-2-one hydrochloride _____ 2
- Highly dispersed silicic acid _____ 1
- Talcum _____ 97

The active substances are intimately mixed and milled with the carriers. With Components (a) a 100% and with Components (b) a 2% dust is obtained which can be used for the treatment of seed beds or the dusting of plants.

DRESSING

To produce a 10% pulverulent dressing, the following components are used:

(a) Parts
- 4,4'-dichloro-2-hydroxy-diphenylether _____ 10
- Kieselguhr _____ 5
- Liquid paraffin _____ 1
- Talcum _____ 84

To produce a 60% pulverulent dressing, the following components are used:

(b) Parts
- 4,2',4'-trichloro-2-hydroxy-diphenylether _____ 60
- Kieselguhr _____ 15
- Liquid paraffin _____ 1
- Talcum _____ 24

The active ingredient is intimately mixed in a mixer, using the paraffin as distributing agent, with the carriers and the whole is milled. The pulverulent dressings obtained serve for the treatment of seeds of all types.

WETTABLE POWDER

Components (a) Parts
- 4,4'-dichloro-2-hydroxy-diphenylether _____ 50
- Kieselguhr _____ 15
- Cetyl polyglycol ether _____ 2
- Tetramethyldecine-(5)-diol-(4,7) (Surtynol 104) _____ 5
- A condensation product of propylene oxide and ethylene oxide ("pluronic F 68") _____ 1.5
- A condensation product of propylene oxide and ethylene oxide ("Pluronic L 61") _____ 1.5
- Silicon _____ 2
- Kaolin _____ 23

(b)
- 3-methyl-dodecylamino-azacycloheptane-2-one _____ 50
- Kieselguhr _____ 10
- Cetyl polyglycol ether _____ 5
- Kaolin _____ 35

The active ingredients are mixed with the carriers and distributing agents given and finely milled. 50% wettable powders are obtained the wettability and suspendability of which are excellent.

On diluting these wettable powders with water, suspensions are produced which are suitable for the treatment of fruit trees.

GRANULATE

Components (a) Parts
- One of the 50% wettable powders given above under (a) or (b) _____ 4
- Carbowax _____ 3.5
- Ground limestone _____ 92
- Highly dispersed silicic acid _____ 0.5

(b)
- 4,2',4'-trichloro-2-hydroxy-diphenylether _____ 2
- Carbowax _____ 2
- Ground limestones _____ 95.5
- Highly dispersed silicic acid _____ 0.5

The ground limestone is evenly impregnated with the Carbowax. This is then mixed with the mixture consisting of active ingredient or the wettable powder and the highly dispersed silicic acid.

These granulates are excellently suitable for the disinfection of seed beds.

PASTES

Components

Parts
- 4,4'-dichloro-2-hydroxy-diphenylether _____ 50
- Nonylphenol/ethylene oxide condensation product (having 8–10 ethylene oxide groups per molecule) _____ 14
- Spindle oil _____ 3.5
- Soap powder _____ 0.5
- Water _____ 32

The active substance is intimately mixed and milled with the additives in a mixer. A 50% paste is obtained which, before use as fungicide, can be diluted with water to any concentration desired.

EMULSION CONCENTRATE

Components

Parts
- 4,2',4'-trichloro-2-hydroxy-diphenylether _____ 10
- Xylene _____ 55
- Dimethyl formamide _____ 32
- Emulsifying mixture: alkylaryl polyethylene glycol/alkylaryl sulphonate/potassium salt _____ 3

The active substance is dissolved in the mixture of xylene and dimethyl formamide. This solution is then added to the emulsifying mixture. A 10% emulsifiable solution is obtained which can be diluted with water to form emulsions of any concentration desired.

We claim:
1. A compound of the formula

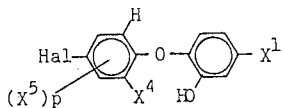

wherein
$X^1$ is a member selected from the group consisting of chlorine and bromine,
Hal is a halogen atom,
$X^4$ is a member selected from the group consisting of hydrogen, chlorine, bromine and cyano,
$X^5$ is a member selected from the group consisting of hydrogen, chlorine, bromine, alkyl of from 1 to 3 carbon atoms, and
$p$ is one of the integers 1 and 2.

2. A compound of the formula

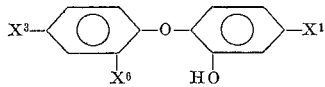

wherein
$X^1$ is a member selected from the group consisting of chlorine and bromine,
$X^3$ is a member selected from the group consisting of chlorine and bromine, and
$X^6$ is a member selected from the group consisting of hydrogen and chlorine.

3. A compound as defined in claim 2, wherein each of $X^1$, $X^3$ and $X^6$ represents chlorine.

4. A compound as defined in claim 2, wherein each of $X^1$ and $X^3$ represents chlorine and $X^6$ is hydrogen.

References Cited

UNITED STATES PATENTS

| | | | |
|---|---|---|---|
| 2,950,325 | 8/1960 | Britton et al. | 260—613 XR |
| 3,405,184 | 10/1968 | Widiger et al. | 260—613 |
| 3,417,146 | 12/1968 | Linn et al. | 260—613 XR |

OTHER REFERENCES

Tomita et al., Chem. Abs., vol 47 (1953), 7028.

BERNARD HELFIN, Primary Examiner

U.S. Cl. X.R.

260—465, 479, 456, 476, 463, 410, 294.7, 247.7, 999; 106—15; 252—106; 424—341, 304, 43, 311; 71—3